United States Patent
Zhou et al.

(10) Patent No.: US 12,450,841 B2
(45) Date of Patent: Oct. 21, 2025

(54) EMBEDDINGS REPRESENTING VISUAL AUGMENTATIONS

(71) Applicant: Snap Inc., Santa Monica, CA (US)

(72) Inventors: Zhenpeng Zhou, Newark, CA (US); Patrick Poirson, Gilbert, AZ (US); Maksim Gusarov, Marina del Rey, CA (US); Chen Wang, Great Neck, NY (US); Oleg Tovstyi, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 168 days.

(21) Appl. No.: 18/304,078

(22) Filed: Apr. 20, 2023

(65) Prior Publication Data
US 2024/0355063 A1 Oct. 24, 2024

(51) Int. Cl.
*G06T 19/00* (2011.01)
*G06T 1/00* (2006.01)
*G06V 10/74* (2022.01)
*H04N 5/262* (2006.01)

(52) U.S. Cl.
CPC .......... *G06T 19/006* (2013.01); *G06T 1/0021* (2013.01); *G06V 10/761* (2022.01); *H04N 5/2621* (2013.01)

(58) Field of Classification Search
None
See application file for complete search history.

(56) References Cited

U.S. PATENT DOCUMENTS

| | | | |
|---|---|---|---|
| 9,239,835 B1 * | 1/2016 | Tiwari | G06F 16/00 |
| 10,334,202 B1 * | 6/2019 | Zhou | G06N 3/045 |
| 11,917,266 B1 * | 2/2024 | Pundi Ananth | H04N 21/8153 |
| 2014/0267405 A1 * | 9/2014 | Mullins | G06F 3/04815 |
| | | | 345/633 |
| 2014/0267406 A1 * | 9/2014 | Mullins | G06T 11/001 |
| | | | 345/633 |
| 2015/0095804 A1 * | 4/2015 | Grossman | G06F 3/04845 |
| | | | 715/753 |

(Continued)

FOREIGN PATENT DOCUMENTS

WO   WO-2024220547 A1   10/2024

OTHER PUBLICATIONS

Chen, Ting, et al., "Big Self-Supervised Models are Strong Semi-Supervised Learners", arXiv:2006.10029v2 [cs.LG], (Oct. 26, 2020), 18 pgs.

Grill, Jean-Bastien, et al., "Bootstrap Your Own Latent a New Approach to Self-Supervised Learning", arXiv:2006.07733v3 [cs.LG], (Sep. 10, 2020), 35 pgs.

Khosla, Prannay, et al., "Supervised Contrastive Learning", arXiv:2004.11362v5 [cs.LG], (Mar. 10, 2021), 23 pgs.

(Continued)

*Primary Examiner* — Martin Mushambo
(74) *Attorney, Agent, or Firm* — Schwegman Lundberg & Woessner, P.A.

(57) ABSTRACT

An input video item that includes a target visual augmentation is accessed. A machine learning model uses the input video item to generate an embedding. The embedding may comprise a vector representation of a visual effect of the target visual augmentation. The machine learning model is trained, in an unsupervised training phase, to minimize loss between training video representations generated within each of a plurality of training sets. Each training set comprises a plurality of different training video items that each include a predefined visual augmentation. Based on the generation of the embedding of the input video item, the target visual augmentation is mapped to an augmentation identifier.

20 Claims, 18 Drawing Sheets

(56) References Cited

U.S. PATENT DOCUMENTS

| | | | |
|---|---|---|---|
| 2017/0228598 A1* | 8/2017 | Eaton | G06V 40/20 |
| 2018/0101540 A1* | 4/2018 | Stoop | G06F 16/7867 |
| 2018/0204068 A1* | 7/2018 | Eaton | G06F 16/285 |
| 2019/0220525 A1* | 7/2019 | Song | G06F 18/217 |
| 2019/0258722 A1* | 8/2019 | Guo | G06F 16/9024 |
| 2019/0258963 A1* | 8/2019 | Guo | G06F 16/3322 |
| 2019/0286943 A1* | 9/2019 | Leskovec | G06F 18/29 |
| 2019/0392323 A1* | 12/2019 | Yan | G06N 3/082 |
| 2020/0193164 A1* | 6/2020 | Katti | G06V 10/82 |
| 2020/0302185 A1* | 9/2020 | Hussein | G06V 10/426 |
| 2020/0355925 A1* | 11/2020 | Hu | H04W 4/80 |
| 2021/0166066 A1* | 6/2021 | Ando | G06V 10/764 |
| 2021/0334994 A1* | 10/2021 | Park | G06T 7/593 |
| 2021/0397266 A1* | 12/2021 | Gupta | G06N 20/10 |
| 2022/0245140 A1* | 8/2022 | Gylfason | G06F 9/54 |
| 2023/0020218 A1 | 1/2023 | Berger et al. | |
| 2023/0113643 A1* | 4/2023 | Mittal | G06F 16/75 382/159 |

OTHER PUBLICATIONS

Kondratyuk, Dan, et al., "MoViNets: Mobile Video Networks for Efficient Video Recognition", arXiv:2103.11511v2 [cs.CV], (Apr. 18, 2021), 21 pgs.

"International Application Serial No. PCT/US2024/024998, International Search Report mailed Jul. 5, 2024", 4 pgs.

"International Application Serial No. PCT/US2024/024998, Written Opinion mailed Jul. 5, 2024", 8 pgs.

Chen, Ting, et al., "A Simple Framework for Contrastive Learning of Visual Representations", arXiv:2002.05709v3 [cs.LG], (Jul. 1, 2020), 20 pgs.

Gowda, Shreyank N., et al., "Learn2Augment: Learning to Composite Videos for Data Augmentation in Action Recognition", 17th European Conference, Tel Aviv, Israel, Oct. 23-27, 2022, Proceedings, Part XXXI, In: "European Conference on Computer Vision", vol. 13691, [Online]. Retrieved from the Internet: <https://link.springer.com/content/pdf/10.1007/978-3-03-19821-2_14.pdf?pdf=inline%20link>, (Oct. 23, 2022), 242-259.

\* cited by examiner

EMBEDDINGS REPRESENTING VISUAL AUGMENTATIONS

TECHNICAL FIELD

Subject matter disclosed herein relates, generally, to machine learning. More specifically, but not exclusively, subject matter disclosed herein relates to representation learning, including example machine learning models that are trained to generate vector representations of visual content.

BACKGROUND

Machine learning models are applications that provide computer systems the ability to perform tasks, without explicitly being programmed, by making inferences based on patterns found in the analysis of data. Machine learning explores the study and construction of algorithms, also referred to as models, that may learn from existing data and make predictions about new data.

Representation learning is a subfield of machine learning that focuses on learning useful features, or representations, of data. A machine learning model may automatically learn a set of features that capture essential characteristics of input data. For example, a machine learning model can find a transformation, or mapping, from the input data to a new representation that is more compact than the input data, while containing important information about the input data, thus making it useful in downstream tasks.

In the context of visual representation learning, e.g., learning from input images, a machine learning model may be trained to map high-dimensional visual inputs to a lower-dimensional space. The term "embedding," as used in this disclosure, refers to such a representation of visual content, in a lower-dimensional space, that aims to capture or preserve important visual characteristics of the content.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
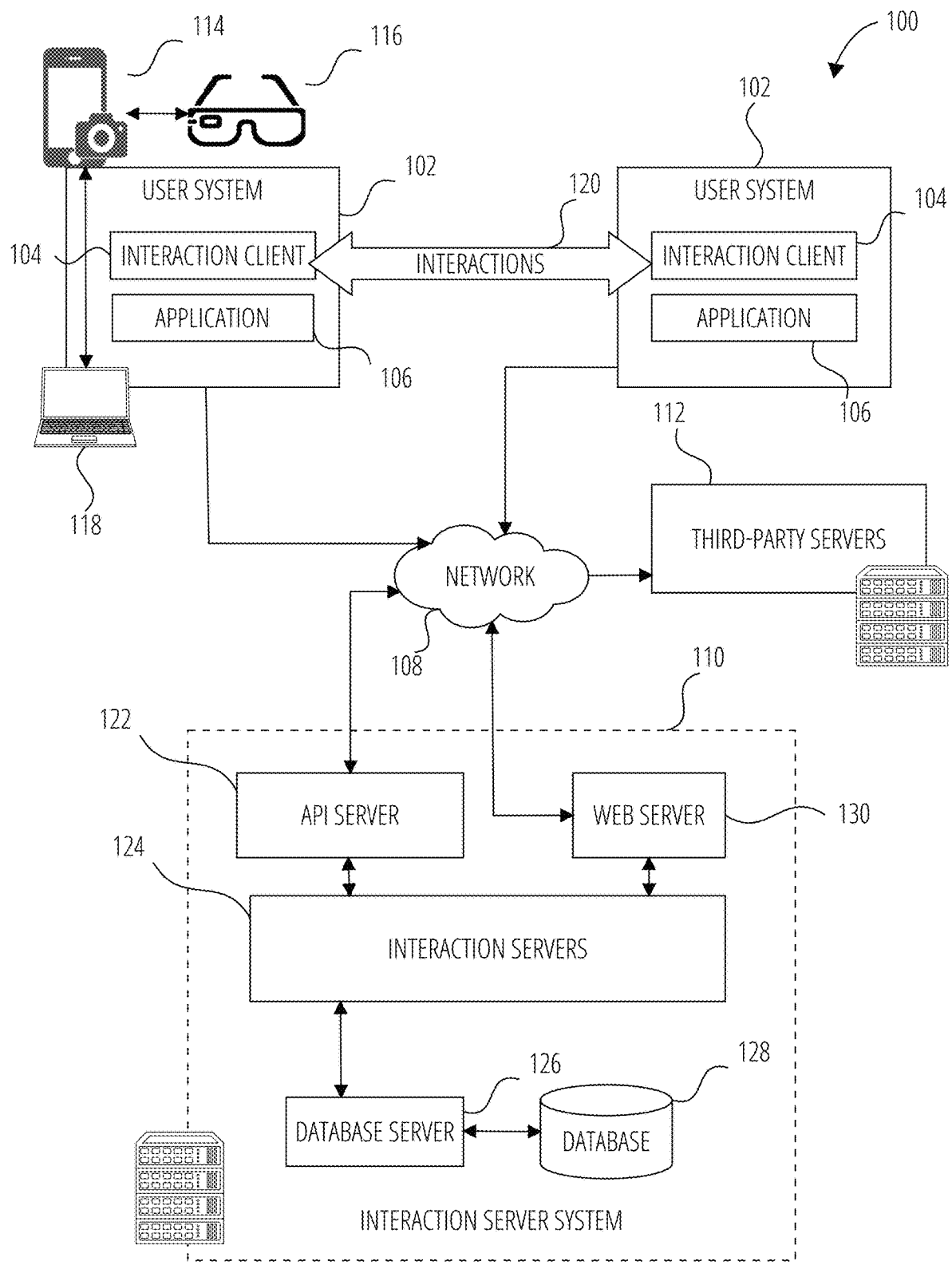
FIG. 1 is a diagrammatic representation of a networked environment in which the present disclosure may be deployed, according to some examples.

As used in this disclosure, the term "visual augmentation" refers to any effect, modification, removal, or addition, that alters an image (or sequence of images) when compared to what would be observed if captured and presented without any such effect, modification, removal, or addition. Examples of visual augmentations may include two-dimensional or three-dimensional augmented reality effects, filters, lenses, media overlays (e.g., text, color, or image overlays), augmented reality experiences, virtual reality experiences, extended reality (XR) experiences, or combinations thereof.

Visual augmentations render special, interesting, entertaining, or useful effects on content items, such as images or videos. For example, a user of an interaction application may select a visual augmentation to be applied to video content captured using a camera of a user device. The visual augmentation may then be applied in real-time, e.g., applied to an object presented in a camera feed interface before or during capturing of the content, or after the content has been captured, e.g., applied to a video file retrieved from a memory of the user device.

Examples of the present disclosure provide a computerized mechanism for generating a representation of the visual effect of a visual augmentation. The visual effect may include, for example, a change in visual appearance caused by the visual augmentation, e.g., applying an overlay onto the face of a person, or changing the colors of an image. In some cases, the visual effect of the visual augmentation may include a change in the format or style of a content item, e.g., applying a "green screen" effect to a video captured by a user. In some cases, the visual effect may result in both aesthetic and format changes.

While conventional systems may enable generation of a vector representation of an image or video, e.g., using machine learning models, such systems are deficient in that the generated representations do not appropriately represent a visual augmentation applied within the image or video. For example, a user may capture a first "selfie" (self-portrait) video at the beach and apply a visual augmentation to a captured facial feature, and then capture a second "selfie" video in a jungle and apply the same visual augmentation with respect to the second video. Representations generated from these videos may be substantially different, for example, as a result of the significant differences between the background scenes in the two videos. Accordingly, the output of conventional systems may be of limited use in the context of visual augmentations, e.g., for the identification, comparison, retrieval, or ranking of visual augmentations within an interaction system. Furthermore, conventional systems may be unable to provide a pipeline of suitable content to train machine learning models to generate output that represent visual augmentations in a useful or appropriate manner.

In some examples of the present disclosure, technical deficiencies of conventional systems may be addressed or alleviated by generating an embedding for a particular visual augmentation in order to capture the effect of the visual augmentation, e.g., in the form of a numerical representation. The particular visual augmentation may be mapped to an embedding (e.g., a list of float numbers). The embedding for a particular visual augmentation may be determined by aggregating a plurality of embeddings generated using sample content items to which the particular visual augmentation was applied.

Further, an embedding can capture the visual effect of the particular visual augmentation in relation to other visual augmentations, e.g., such that similar visual augmentations have similar embeddings, thus providing useful output when compared to output of conventional systems. The mapping of the visual effects of augmentations to corresponding embeddings provides a mechanism for understanding and comparing different augmentations. Accordingly, in some examples, the visual effect of an augmentation is mapped to a feature (e.g., a vector) that can be consumed by a downstream machine learning model, or other tool. Embeddings generated in this manner may be used for various downstream tasks, e.g., consumed by machine learning models trained for augmentation tagging, augmentation ranking, or augmentation retrieval within an interaction system.

Prior to deploying a machine learning model that can generate embeddings representing important features of visual augmentations, the model may be trained, e.g., using an unsupervised learning approach. In some examples, self-supervised learning is employed to train a model to focus on the appearance or effect of a visual augmentation within a video, as opposed to other content within the video (e.g., background content that is not altered by the visual augmentation). The machine learning model may be trained to minimize loss between training video representations generated within each of a plurality of training sets. Each training set may include different training video items that each include the same predefined visual augmentation.

In the context of video content, the machine learning model may be trained on pairs of videos. A pair may comprise two different plate videos, or background videos, to which the same visual augmentation was applied, e.g., using an automated lens rendering service. An automated lens rendering service may provide a pipeline of suitable content to train machine learning models to generate output that represent visual augmentations in a useful or appropriate manner.

In some examples, for each of a plurality of visual augmentations, two videos rendered on different backgrounds may be sampled. A representation is generated for each video, and one of the representations is transformed, e.g., by a predictor network, to generate a transformed representation. A loss function may consider the similarity between the transformed representation and the original representation that was not transformed. The process may be repeated, e.g., a predefined number of times for each visual augmentation, or using a predefined number of training pairs, to ensure adequate training. In this way, the machine learning model is trained to generate similar embeddings for video pairs that include the same (or similar) visual augmentations, and dissimilar embeddings for video pairs that include dissimilar visual augmentations.

In some examples, the training phase of the machine learning model may comprise self-supervised, positive-only contrastive learning. In positive-only learning, the machine learning model may be trained exclusively on positive pairs, e.g., pairs of videos including the same visual augmentation. In other examples, the training phase of the machine learning model may comprise contrastive learning in which the model is also trained on negative pairs, e.g. pairs of videos with different visual augmentations applied thereto (such as the same background video with different visual augmentations between the two videos). In some cases, this may facilitate the model learning to map similar inputs to nearby points in the feature space, while pushing dissimilar inputs farther apart. Specifically, the model may more easily or better learn to discriminate between items with the same or similar augmentations and items with different (or dissimilar) augmentations.

Once trained, inference can be run on an input video item that includes a visual augmentation to generate an embedding that captures the visual effect of the visual augmentation applied to the input video item. In some examples, multiple embeddings are generated for a particular visual augmentation by running inference on multiple different videos that all have the particular visual augmentation applied to it. An aggregated embedding may be determined, e.g., based on a mean of the embeddings, and the aggregated embedding may be designated as an augmentation identifier for the particular visual augmentation. In this way, where an interaction system employs a large number of visual augmentations, an augmentation identifier can be obtained for each visual augmentation and stored in a database, e.g., a one-to-one mapping between each visual augmentation and its corresponding augmentation identifier (in vector form) can be stored for further use.

Examples of the present disclosure thus relate to the training of machine learning models to generate vector representations of visual augmentations applied to content items, the deployment of such machine learning models, and the mapping of vector representations to their corresponding visual augmentations. Systems and methods described herein may be useful in addressing the example technical problem of creating a vector representation of a visual augmentation from a video (or from a representation of the video) that contains the visual augmentation together with base content to which the visual augmentation is applied.

Examples described herein can address or alleviate technical problems associated with representation learning of visual augmentations. Particularly, but not exclusively, the present disclosure describes systems and methods that facilitate the application of a self-supervised learning approach to videos to map augmentation-specific features from videos to a lower-dimensional space. Examples of the present disclosure take the temporal dimension associated with augmented videos into account to ensure that the effect of an augmentation along the temporal dimensional is captured in an embedding.

Examples described herein may provide an efficient or scalable system for generating high-quality embeddings. Further, a technical problem of generating a useful mapping for visual augmentation understanding or comparison purposes can be addressed or alleviated by examples of the present disclosure.

Embeddings generated using techniques described herein may be used for various purposes, such as reducing or eliminating duplication of visual augmentations in a database or interaction system, facilitating retrieval of augmentations from a storage location, generating insights with respect to similarities or differences between augmentations, predicting augmentation tags within content items, ranking augmentations, or clustering meaningful sets of visual augmentations for presentation to a user.

When the effects in this disclosure are considered in aggregate, one or more of the methodologies described herein may obviate a need for certain efforts or resources that otherwise would be involved in data extraction. Computing resources used by one or more machines, databases, or networks may be more efficiently utilized or even reduced, e.g., as a result of more efficient and accurate embedding generation, reduced duplication, or improving augmentation ranking or retrieval. Examples of such computing resources may include processor cycles, network traffic, memory usage, graphics processing unit (GPU) resources, data storage capacity, power consumption, and cooling capacity.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, content augmentation (e.g., filters or overlays), message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 1410); the location of friends within an entity relationship graph; and opening an application event (e.g., relating to the interaction client 104). The interaction servers 124 host multiple systems and subsystems, described below with reference to FIG. 2.

System Architecture

Figure 2:
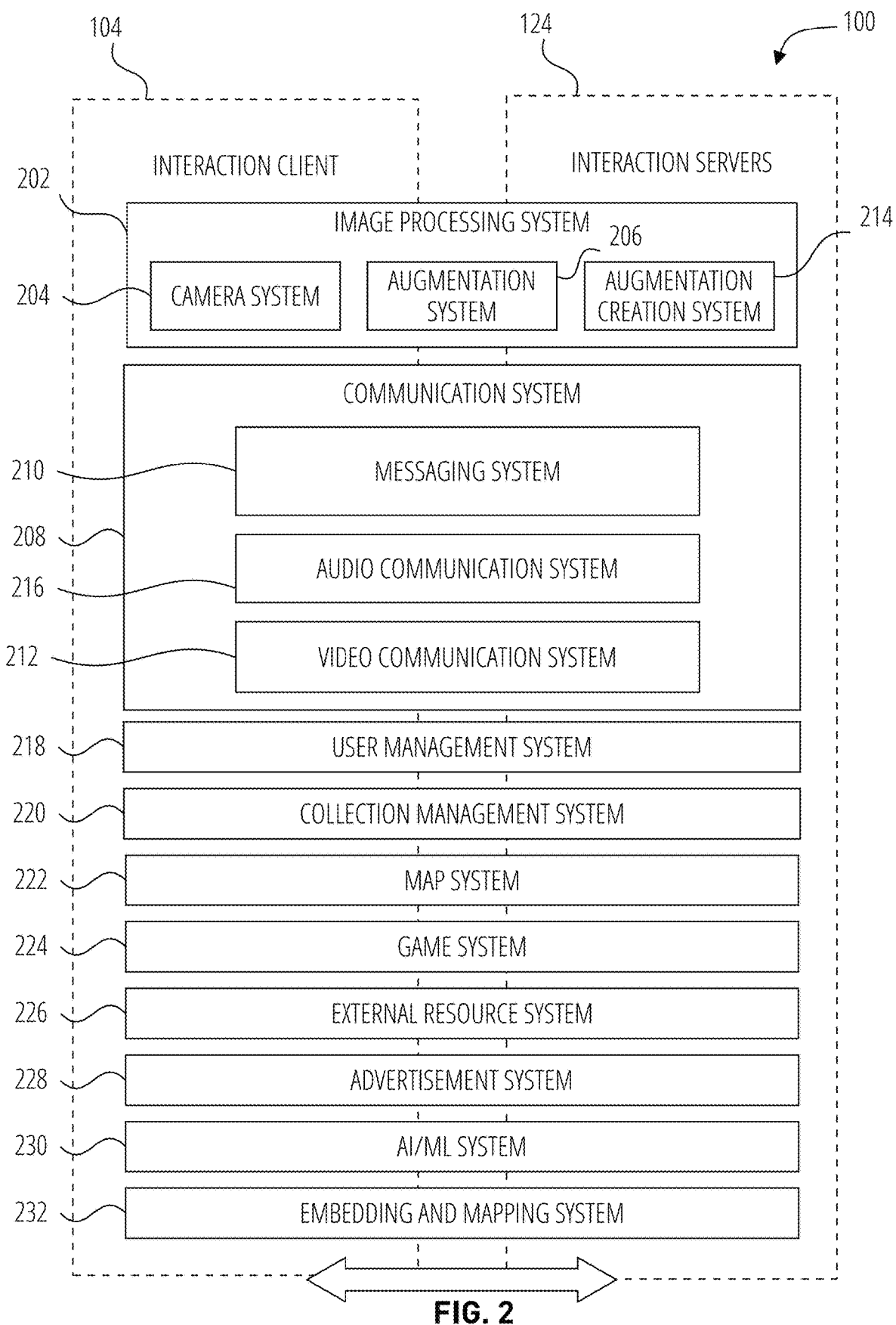
FIG. 2 is a diagrammatic representation of an interaction system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture. Example subsystems are discussed below.

An image processing system 202 provides various functions that enable a user to capture and augment (e.g., annotate, or otherwise modify or edit) media content associated with a message. A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., filters or media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1602 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. As explained above, a "visual augmentation" refers to a visual effect applied to content. Examples of audio and visual content include pictures, texts, logos, animations, and sound effects. The audio and visual content or the visual effects can be applied to a media content item (e.g., a photo or video) at the user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates. In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 1408, entity graphs 1410 and profile data 1402) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location functions and supports the presentation of map-based media content and messages by the interaction client 104. For example, the map system 222 enables the display of user icons or avatars (e.g., stored in profile data 1402) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information can then be used by the image processing system 202 to enhance, filter, or manipulate (e.g., apply a visual augmentation to) images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic.

The artificial intelligence and machine learning system 230 may also provide chatbot functionality to message interactions 120 between user systems 102 and between a user system 102 and the interaction server system 110. The artificial intelligence and machine learning system 230 may also provide generative functionality, e.g., allowing a user to generate text, image, or video content based on prompts. The artificial intelligence and machine learning system 230 may work with the audio communication system 216 to provide speech recognition and natural language processing capabilities, allowing users to interact with the interaction system 100 using voice commands.

An embedding and mapping system 232 is responsible for generating embeddings that capture the visual effect of respective visual augmentations that are available, or considered to be made available, to users within the interaction system 100. The embedding and mapping system 232 may work with the artificial intelligence and machine learning system 230 to provide training of one or more machine learning models for this purpose, and to run inference on input content items (e.g., videos that include augmentations) to extract embeddings from the input content items. The embedding and mapping system 232 is also responsible for storing embeddings, e.g., storing aggregated embeddings in the form of augmentation identifiers, thereby creating mappings between augmentations and their corresponding embeddings within the interaction system 100. The embedding and mapping system 232 may work with the artificial intelligence and machine learning system 230 to invoke machine learning models that consume these embeddings, e.g., the embedding and mapping system 232 may provide embeddings to an augmentation ranking machine learning model implemented by the artificial intelligence and machine learning system 230 that uses embeddings, as input data, to generate rankings for sets of visual augmentations.

Figure 3:
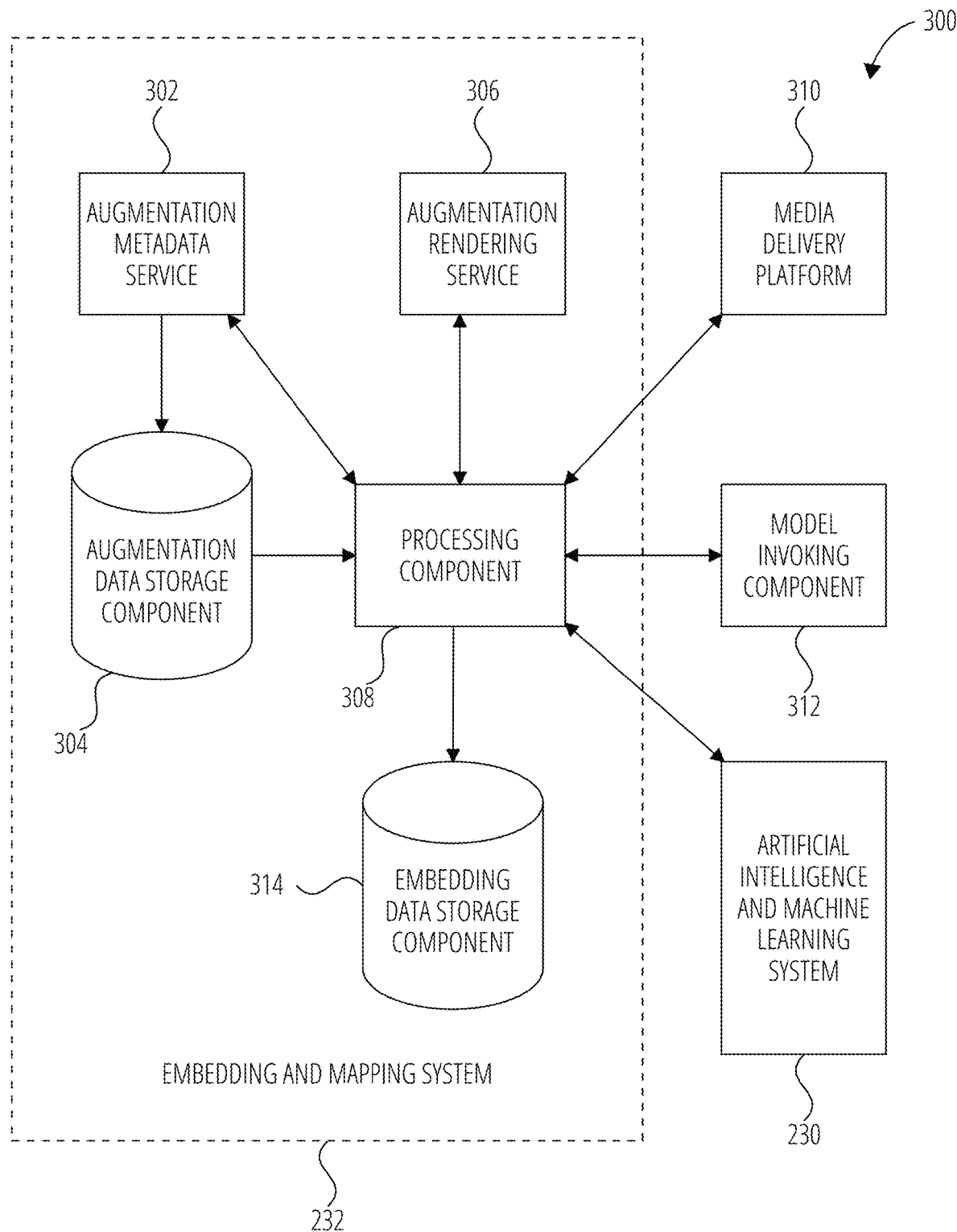
FIG. 3 is a block diagram illustrating interactions between certain components of an interaction system, including an artificial intelligence and machine learning system, and an embedding and mapping system, according to some examples.

The diagram 300 in FIG. 3 illustrates interactions between certain components of the interaction system 100, including the embedding and mapping system 232 and the artificial intelligence and machine learning system 230, according to some examples.

In some examples, a pipeline is created to serve production traffic for creating embeddings of visual augmentations, at scale. An augmentation metadata service 302 of the embedding and mapping system 232 provides data relating to augmentations used within the interaction system 100, e.g., identifying information, event information, usage statistics, or other metadata. The data may be stored in a database, such as an augmentation data storage component 304 forming part of the embedding and mapping system 232.

An augmentation rendering service 306 is configured to render specific visual augmentations on plate videos, also referred to as background videos. In other words, the augmentation rendering service 306 provides an automated service that is capable of supplying input video items from which embeddings can be generated. The augmentation rendering service 306 may retrieve plate videos from a library in the databases 128 and render a visual augmentation onto each plate video. For example, for a particular visual augmentation, the augmentation rendering service 306 may render the visual augmentation onto 50, 100, or 1000, plate videos, for downstream use in training or inference, as described further below. Rendered videos may be converted to a binary format (e.g., TFRecord format) for downstream processing by a processing component 308 of the embedding and mapping system 232.

The augmentation rendering service 306 can also be used in a training phase. For example, and as is further described below, an augmentation rendering component such as the augmentation rendering service 306 may be used to apply a predefined visual augmentation to a first plate video and to a second plate video, in order to define a positive training pair for training a machine learning model.

Still referring to FIG. 3, the processing component 308 may perform various processing functions of the embedding and mapping system 232, as well as processing functions associated with the artificial intelligence and machine learning system 230. The processing component 308 communicates with the augmentation metadata service 302, the augmentation rendering service 306, and the augmentation data storage component 304 to obtain input video items and metadata required for processing the input video items. The processing component 308 may further communicate with a media delivery platform 310, for example, to extract frame rates for respective input videos. The processing component 308 may instruct or call the artificial intelligence and machine learning system 230 to run inference on one or more input video items. For example, the processing component 308 may communicate with the artificial intelligence and machine learning system 230 to utilize a trained machine learning model of the artificial intelligence and machine learning system 230 that generates, from a given input video, an embedding that captures the visual augmentation applied to the given input video. Training and use of such machine learning models, according to examples, is further described below.

In use, the processing component 308 may be triggered or instructed by another component of the interaction system 100, shown as the model invoking component 312 in FIG. 3. For example, where embeddings are to be employed for augmentation ranking purposes (e.g., to create lists of similar augmentations to surface to a user on the interaction client 104), the model invoking component 312 may be a component of a ranking system that transmits a request for embedding data relating to one or more specific visual augmentations.

Embeddings may be stored, by the processing component 308, in an embedding data storage component 314. In some examples, embeddings generated for the same visual augmentation (e.g., from different plate videos) may be aggregated, e.g., by generating a mean, average, concatenated, or other combined embedding. Aggregated embeddings may be stored in the embedding data storage component 314 and, for example, used as identifiers or representations of respective visual augmentations for downstream tasks, such as rankings.

In some examples, the processing component 308 may periodically update the embedding data storage component 314, e.g., to add embeddings for new visual augmentations within the interaction system 100.

Figure 4:
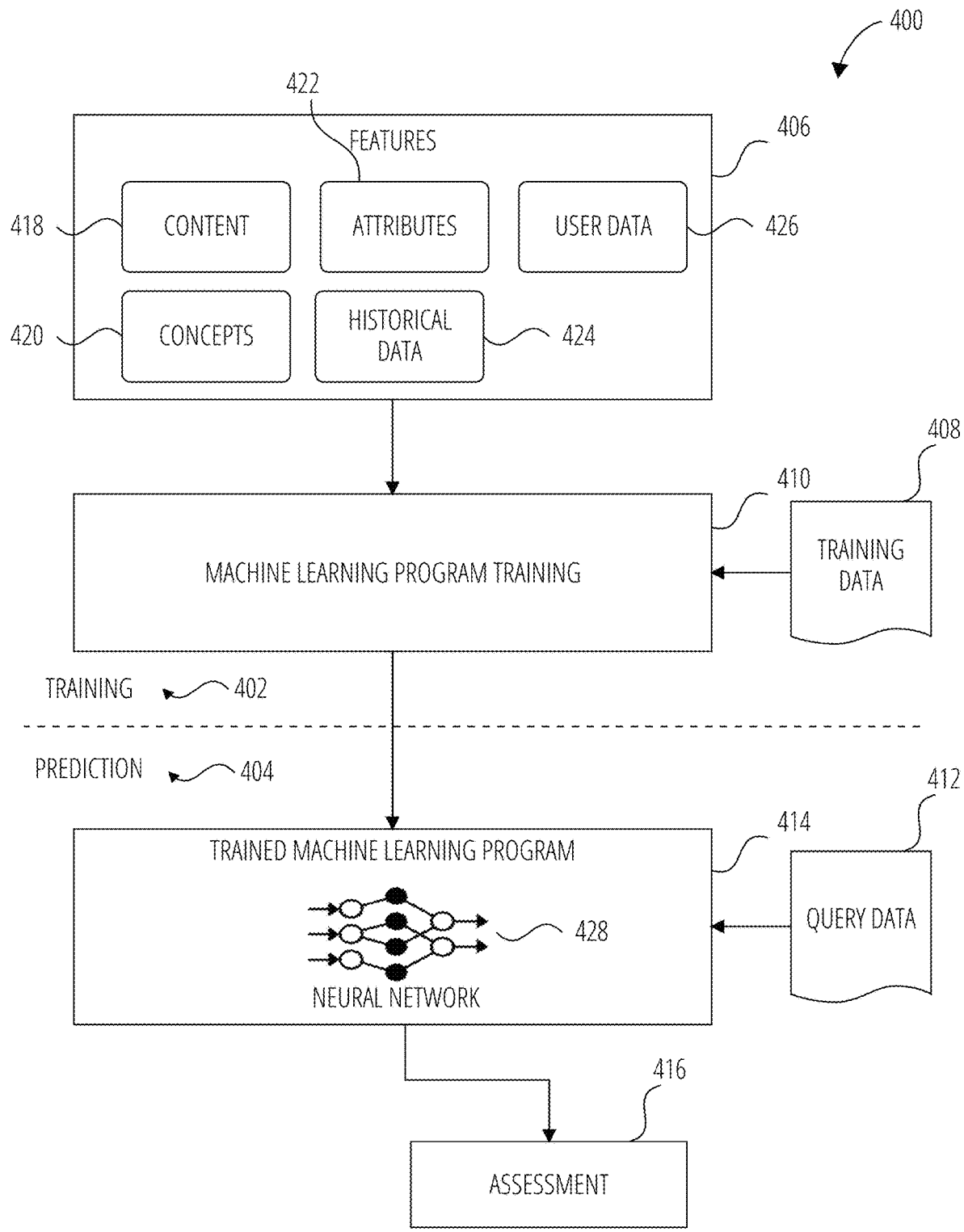
FIG. 4 is a diagram illustrating training and use of a machine learning program, according to some examples.

FIG. 4 is a block diagram generally illustrating a machine learning program 400, according to some examples. Machine learning programs, also referred to as machine learning algorithms or tools, are used as part of the techniques and systems described herein to perform operations associated with the generation of embeddings.

Machine learning explores the study and construction of algorithms, also referred to herein as tools, that may learn from or be trained using existing data and make predictions about or based on new data. Such machine learning tools operate by building a model from training data 408 in order to make data-driven predictions or decisions expressed as outputs or assessments (e.g., assessment 416). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used. Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 400 supports two types of phases, namely training phases 402 and prediction phases 404. In training phases 402, supervised learning, unsupervised or reinforcement learning may be used. For example, the machine learning program 400 (1) receives features 406 (e.g., as structured or labeled data in supervised learning) and/or (2) identifies features 406 (e.g., unstructured or unlabeled data for unsupervised learning) in training data 408. In prediction phases 404, the machine learning program 400 uses the features 406 for analyzing query data 412 to generate outcomes or predictions, as examples of an assessment 416 (this phase is also referred to as inference).

In a training phase 402, feature engineering may be used to identify features 406 and may include identifying informative, discriminating, and independent features for the effective operation of the machine learning program 400 in pattern recognition, classification, and regression. In some examples, the training data 408 includes labeled data, which is known data for pre-identified features 406 and one or more outcomes. Each of the features 406 may be a variable or attribute, such as individual measurable property of a process, article, system, or phenomenon represented by a data set (e.g., the training data 408). Features 406 may also be of different types, such as numeric features, strings, and graphs, and may include one or more of content 418, concepts 420, attributes 422, historical data 424 and/or user data 426, merely for example.

The concept of a feature in this context is related to that of an explanatory variable used in statistical techniques such as linear regression. Choosing informative, discriminating, and independent features is important for the effective operation of the machine learning program 400 in pattern recognition, classification, and regression. Features may be of different types, such as numeric features, strings, and graphs.

In training phases 402, the machine learning program 400 uses the training data 408 to find correlations among the features 406 that affect a predicted outcome or assessment 416. With the training data 408 and the identified features 406, the machine learning program 400 is trained during the training phase 402 at machine learning program training 410. The machine learning program 400 appraises values of the features 406 as they correlate to the training data 408. The result of the training is the trained machine learning program 1514 (e.g., a trained or learned model).

Further, the training phases 402 may involve machine learning, in which the training data 408 is structured (e.g., labeled during preprocessing operations), and the trained machine learning program 414 implements a relatively simple neural network 428 capable of performing, for example, classification and clustering operations. In other examples, the training phase 402 may involve deep learning, in which the training data 408 is unstructured, and the trained machine learning program 414 implements a deep neural network 428 that is able to perform both feature extraction and classification/clustering operations.

A neural network 428 generated during the training phase 402, and implemented within the trained machine learning program 414, may include a hierarchical (e.g., layered) organization of neurons. For example, neurons (or nodes) may be arranged hierarchically into a number of layers, including an input layer, an output layer, and multiple hidden layers. Each of the layers within the neural network 428 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 428 may also be one of a number of different types of neural networks, including a single-layer feed-forward network, an Artificial Neural Network (ANN), a Recurrent Neural Network (RNN), a symmetrically connected neural network, an unsupervised pre-trained network, a Convolutional Neural Network (CNN), or a Recursive Neural Network (RNN), merely for example.

During prediction phases 404, or inference, the trained machine learning program 414 is used to perform an assessment. Query data 412 is provided as an input to the trained machine learning program 414, and the trained machine learning program 414 generates the assessment 416 as output, responsive to receipt of the query data 412.

Figure 5:
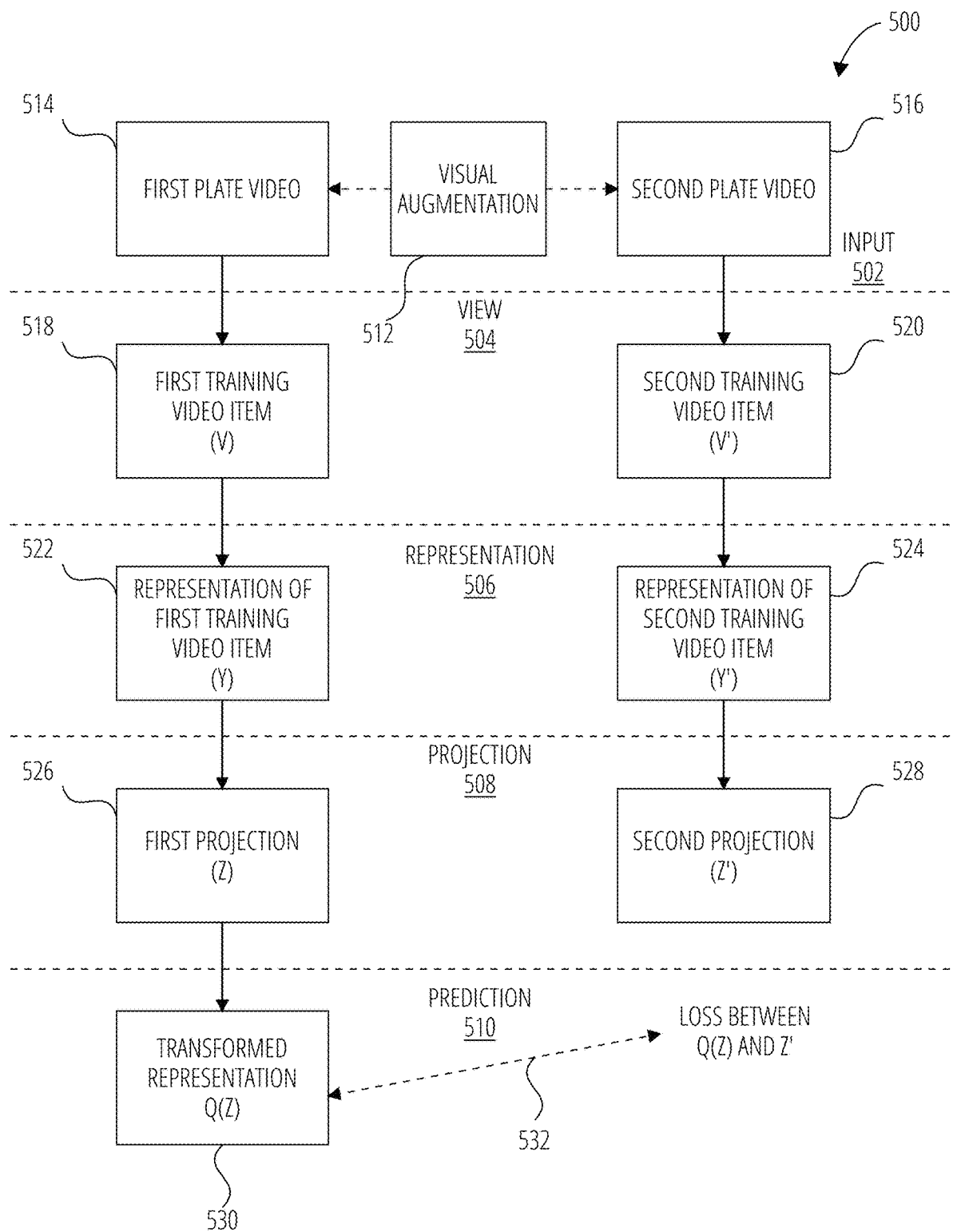
FIG. 5 is a diagram illustrating training of a machine learning model to generate embeddings that represent visual augmentations within input video items, according to some examples.

As mentioned above, FIG. 4 provides a general overview of certain aspects of training and use of a machine learning program. Turning now to FIG. 5, a more detailed process 500 is shown to illustrate training of a machine learning model, according to some examples. Specifically, the process 500 involves training of a machine learning model to generate embeddings that represent visual augmentations appearing within input video items.

The machine learning model of FIG. 5 is trained using self-supervised contrastive learning (the specific form of "contrastive learning" is discussed below). Self-supervised learning is a type of unsupervised learning that involves training a neural network to make predictions without using explicit labels. In self-supervised learning, the model creates its own supervision by defining a task that requires the network to learn something useful about the data. Specifically, in FIG. 5, the training process involves the machine learning model learning to generate a useful representation of input data by comparing representations of different views that include the same visual augmentation.

An objective of the training phase of FIG. 5 is to bring views with similar augmentations closer together in the feature space, while causing views with dissimilar augmentations to be pushed apart as training progresses. Achieving this objective allows, for example, for the generation of embeddings that can be used to compare augmentations, identify augmentations within other content, or deduplicate augmentations in a retrieval phase.

The unsupervised training phase is shown in FIG. 5 to include items that are served as input 502, as well as a view layer 504, a representation layer 506, a projection layer 508, and a prediction layer 510. A pair of training video items is processed through each layer. At a high level, the architecture shown in FIG. 5 may resemble certain aspects of a BYOL (Bootstrap Your Own Latent) architecture for training deep neural networks, e.g., in that a predictor component is added to one "branch" (associated with one of the input items in an input pair), but not to the other "branch" (associated with the other item in the input pair). The approach of FIG. 5 also resembles BYOL in that it utilizes positive training pairs. In the traditional sense, contrastive learning typically involves learning to distinguish positive pairs and negative pairs, where the negative pairs are drawn from a different distribution than the positive pairs.

Referring to the input 502, and as mentioned above, while contrastive learning typically leverages both positive and negative pairs of input samples, examples of the present disclosure utilize only positive pairs, similar to the BYOL approach. However, unlike the BYOL approach that requires, as input, a single sample, which is then transformed into two augmented views, the architecture of FIG. 5 utilizes a positive pair specifically originating from two different videos. For example, two input video items may be generated by applying the same visual augmentation 512 to two different videos, e.g., a first plate video 514 and a second plate video 516 that have different backgrounds, objects, content, etc. This is distinct from the BYOL approach, in which two augmented views are typically generated by applying random modifications to the same input sample (e.g., rotations, cropping, or the like, applied to the same original image).

The augmentation rendering service 306 may generate the input 502 needed for each training set in the training phase. It will be appreciated that a large number of training sets (e.g., pairs of videos) may be utilized, covering multiple different visual augmentations, and FIG. 5 only shows one set for illustrative purposes. Each training set may thus comprise a pair of training video items. Within each pair, a first training video item may include first video content to which a first predefined visual augmentation is applied, and a second training video item may include second video content (different to the first video content) to which the same predefined visual augmentation is applied.

In some examples, the augmentation rendering service 306 uses the same large set of plate videos for each visual augmentation. In other words, each visual augmentation is rendered onto all the plate videos in the set utilized by the augmentation rendering service 306. The machine learning model may thus be trained on positive pairs from this training set to improve its ability to extract the important visual features of an augmentation from within a larger video.

Returning now to FIG. 5, the first plate video 514 with the visual augmentation 512 applied thereto defines a first training video item 518, and the second plate video 516 with the visual augmentation 512 applied thereto defines a second training video item 520 within the view layer 504. The view layer 504 takes "raw" video content items and preprocesses them into a form that is suitable for downstream analysis. Preprocessing may involve resizing, cropping, or normalizing video frames.

From the view layer 504, the two input samples are transformed into latent-space vectors to obtain a representation of the first training video item 522 and a representation of the second training video item 524, in the representation layer 506. For example, the first training video item 518 and the second training video item 520 may be input, in binary format, to a video encoder to obtain the representations. In some examples, a video encoder such as a MoViNets (Mobile Video Networks) model may be applied in the representation layer 506.

The term "MoViNets" refers to a family of lightweight CNNs designed for video understanding tasks. A MoViNet model has an encoder-decoder architecture, and may be trained to process video frames using three-dimensional convolutional layers in order to capture spatial and temporal information in the input video. In a traditional two-dimensional CNN, only spatial information in an image is captured. However, in a model such as MoViNet, filters may slide along both spatial and temporal dimensions of a video, capturing information about how objects move and change over time. This may facilitate capturing of visual effects in a video, including the manner in which they change over time. The MoViNet model may include a backbone network, which extracts features from the input video frames using convolutional layers, followed by one or more fully connected layers that generate a vector representation of the input video (e.g., the representation of the first training video item 522 or the representation of the second training video item 524).

The representation layer 506 thus takes, for a particular sample, preprocessed video frames and transforms them into a compact representation that captures important features of the sample. The representation of the first training video item 522 and the representation of the second training video item 524, e.g., as generated by a MoViNet model, can be considered as compact representations of key features and patterns in the frames of the first training video item 518 and the second training video item 520 respectively. In this context, a representation may be a sequence of feature vectors or a single vector that summarizes the entire video. It will be appreciated that MoViNet is merely an example of a type of model that may be employed in some examples to generate representations. Other types of models, e.g., other deep neural network designs, can be employed in examples of the present disclosure.

In some examples, and as shown in FIG. 5, the representation of the first training video item 522 and the representation of the second training video item 524 may each be projected to a smaller space, e.g., by a respective multi-layer perceptron (MLP), to obtain a first projection 526 and a second projection 528. In some examples, input video items may thus undergo non-linear transformations to be mapped to high-dimensional representations in the representation layer 506 and then be compressed into a lower-dimensional space in the projection layer 508, while conserving the most important information. The projection layer 508 may facilitate downstream comparison of vector representations of the original video items.

The representation of the first training video item 518 may then be transformed to yield a transformed representation 530. For example, a predictor component, such as a predictor neural network, may transform the first projection 526 into the transformed representation 530. In some examples, the predictor component of the prediction layer 510 comprises a neural network that takes the first projection 526 as input and applies a series of linear and non-linear transformations to it. The predictor network may include several fully connected layers followed by a non-linear activation function (e.g. ReLU (Rectifier Linear Unit)). The output of the predictor network is a low-dimensional vector in the example form of the transformed representation 530 depicted in FIG. 5.

It is noted that, in some examples, and as is the case in FIG. 5, only one of the items in the training pair is transformed to create a final prediction target, given that the predictor component only applies to one "branch" during training. The first projection 526 may thus be seen as representing an "online" branch of the model (left side of FIG. 5), while the second projection 528 may be seen as representing a "target" branch of the model (right side of FIG. 5). The transformed representation 530—the final prediction target—is used for comparison with the representation of the "target," e.g., the second projection 528.

Specifically, as shown in FIG. 5, a loss function 532 analyzes the similarity between the transformed representation 530, q(z), and the projected representation of the second input video item, z'. For example, the loss function 532 may utilize the cosine similarity between these two representations. Cosine similarity may provide a measure of similarity between two non-zero vectors in a space. It measures the cosine of the angle between two vectors in the multi-dimensional space. A suitable formula for cosine similarity is:

$$\text{cosine\_similarity}(A, B) = (A \cdot B)/(\|A\| * \|B\|),$$

wherein A·B represents the dot product of vectors A and B, and ∥A∥ and ∥B∥ represent the Euclidean norms of A and B respectively.

The cosine similarity, as defined above, ranges from −1 to 1, where 1 indicates that the two vectors are identical and −1 indicates that they are completely dissimilar. To minimize loss, in the context of cosine loss, it is thus desirable to have the cosine similarity as close to 1 as possible (e.g., cosine_loss(A, B) 1−cosine_similarity(A, B)).

The use of a loss function, such as the one described above, encourages the machine learning model, e.g., the example predictor network as described above, to learn a representation that is similar to the "target," e.g., to make the two vectors as similar as possible.

Given that the predicted representation and the "target" are both based on different videos that include the same visual augmentation, this encourages the machine learning model to extract a useful representation of the visual augmentation from the representation of the entire input video item. As training progresses, the machine learning model may learn mappings between a high-dimensional representation of an input video item and a target embedding that captures the most relevant features of the visual augmentation included in the input video item, irrespective of (or substantially irrespective of) other elements appearing in the video, e.g., background objects that are not augmented.

Parameters of the machine learning model are updated to minimize the loss between training video representations within subsequent pairs of training video items based on the loss function. For example, weights of the predictor network are updated using backpropagation to minimize the loss function, e.g., using stochastic gradient descent (SGD) or other optimization algorithms.

In some examples, a sufficiently large number of training samples, e.g., 20 million, 25 million, 30 million, 35 million, or 40 million (merely as examples), may be used. Referring to FIG. 5, one or more components of the online branch (e.g., at 522, 526, 530) may be updated by gradient descent, while gradients are blocked for the target branch (e.g., at 524, 528). In the latter case, weights may be updated by merging the weights for the online branch of the model into the weights for the target branch periodically. The target branch may thus provide a stable and slowly moving target for the online branch to learn from, e.g., using an exponential moving average to update parameters of the target branch.

Accordingly, in some examples, for each training pair, a transformed representation is generated based on an embedding of a first training video item and the transformed representation is compared to the embedding of a second training video item. Minimizing of loss between these training video representations comprises utilizing a suitable loss function to measure a similarity between the transformed representation and the embedding of the second training video item. During training, minimizing the loss function causes the machine learning model to generate output embeddings that capture the visual augmentation applied to an input video item, given that the visual augmentation is common to the items in each training pair.

Figure 6:
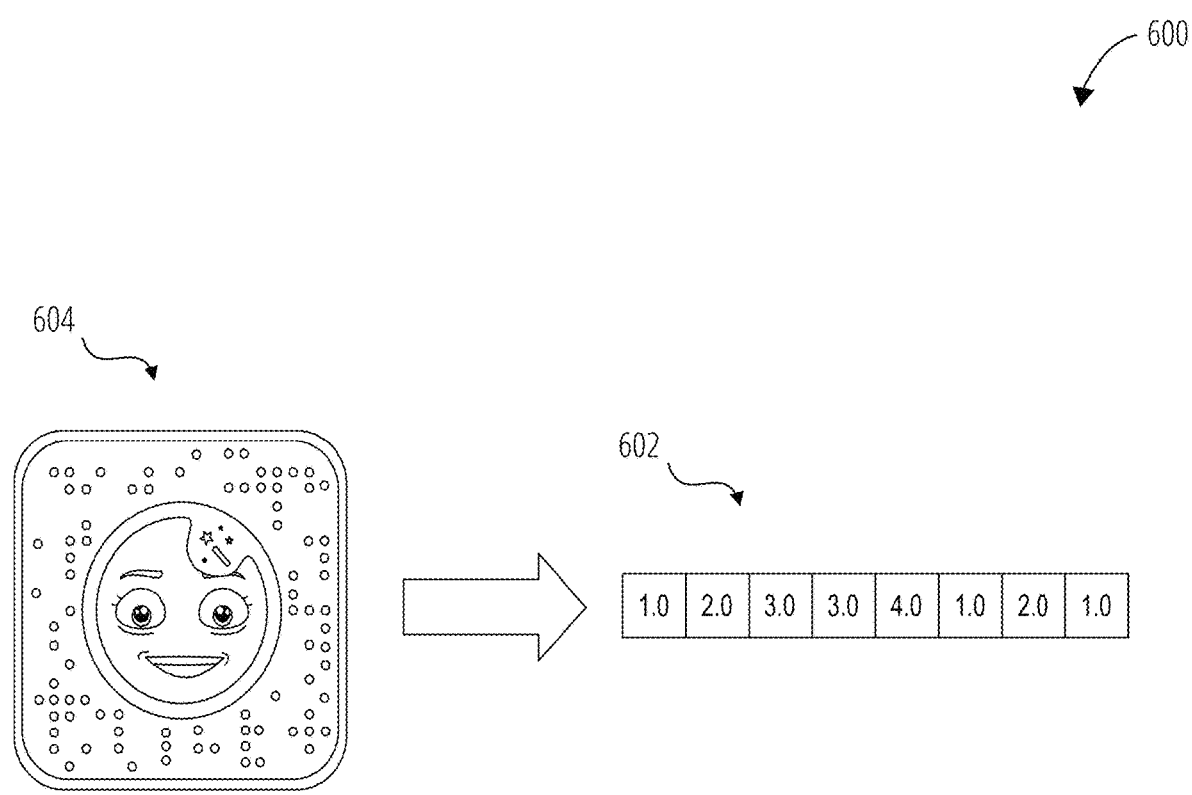
FIG. 6 is a diagram that conceptually illustrates the generation of an embedding to capture visual features or effects of a visual augmentation.

Once a machine learning model has been trained, e.g., as described with reference to FIG. 5, it may be used to map a specific visual augmentation available within the interaction system 100 to an augmentation identifier. The augmentation identifier may be an embedding, such as a list of float numbers as shown in FIG. 6, that captures the visual effect thereof. The architecture and training of the model may ensure that embeddings generated from content items that include dissimilar content (e.g., different background videos), but the same visual augmentation, are similar vectors, while embeddings generated from content items that include dissimilar visual augmentations (even if the other content is similar), are dissimilar vectors.

The diagram 600 in FIG. 6 conceptually illustrates the generation of an embedding 602 that captures visual features or effects of an augmentation 604. It should be noted that the example embeddings shown in FIG. 6 and FIG. 11 to FIG. 13 are simplified examples intended to represent, but not depict, real embeddings.

Using the training approach outlined above with reference to FIG. 5, the trained machine learning model is able to output useful embeddings within the context of an interaction system 100 that enables users to apply visual augmentations to content. Specifically, in some examples, the trained "online branch" may be used to run inference on new inputs to generate such useful embeddings. The "target branch" used during training may, in some cases, be discarded for inference purposes.

Figure 7:
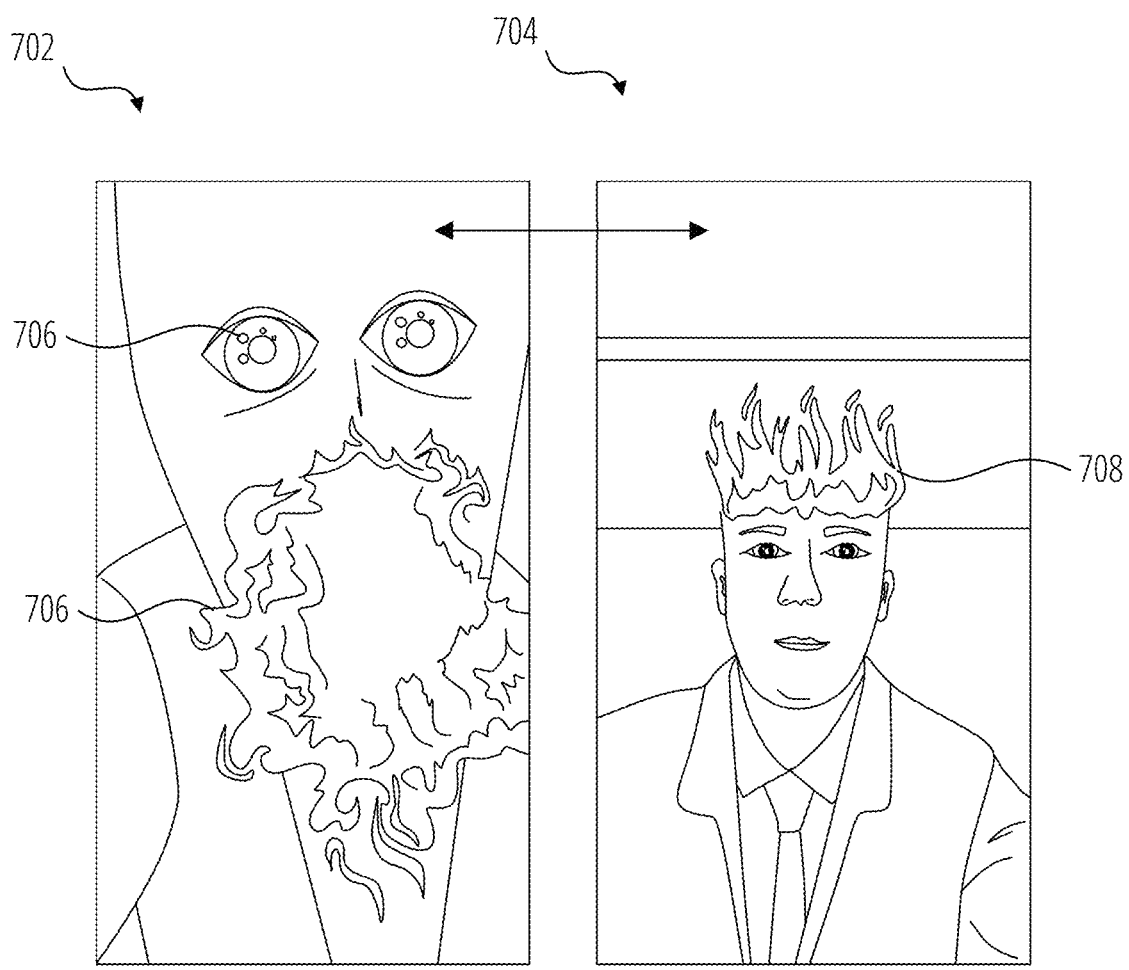
FIG. 7 illustrates example frames of each of a pair of visually augmented videos, according to some examples.
Figure 8:
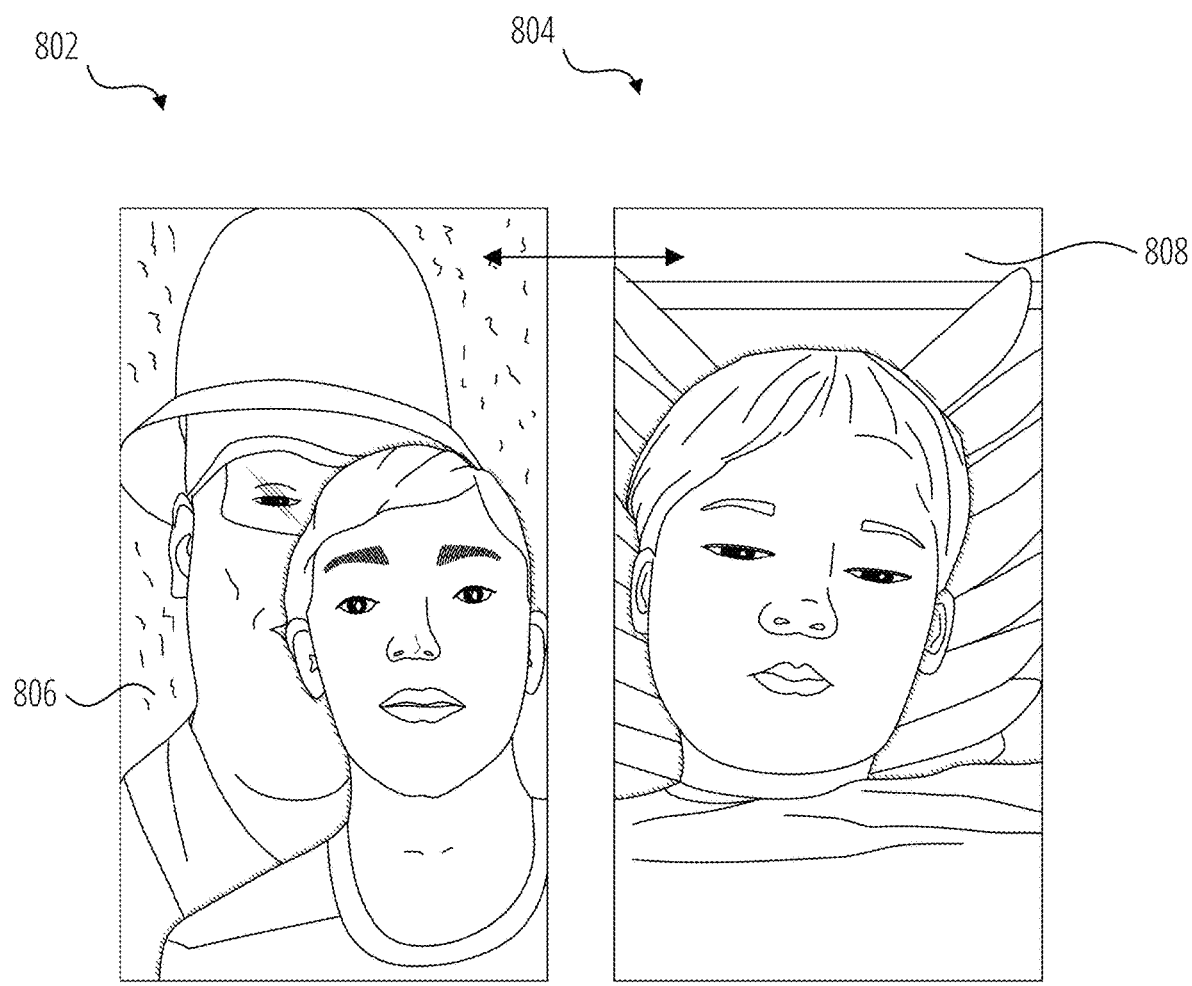
FIG. 8 illustrates example frames of each of a pair of visually augmented videos, according to some examples.
Figure 9:
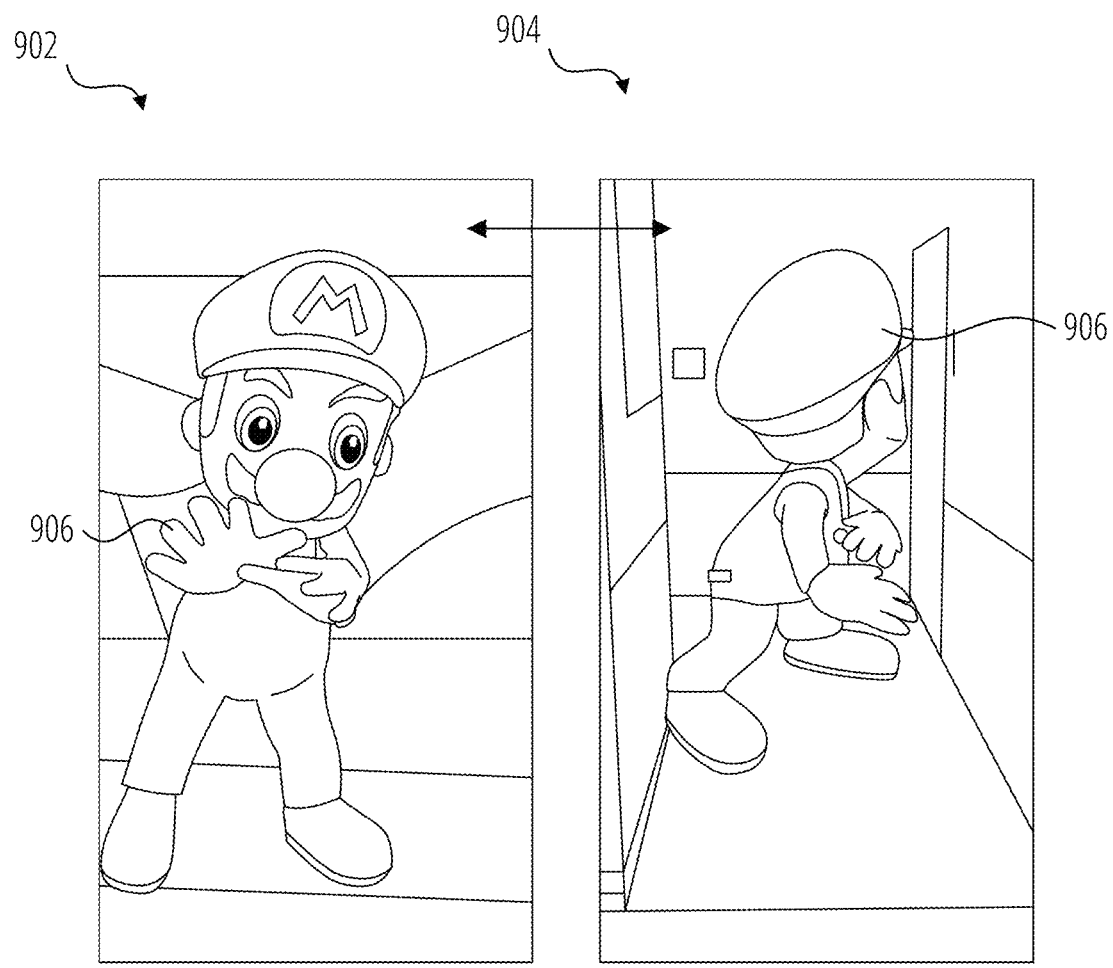
FIG. 9 illustrates example frames of each of a pair of visually augmented videos, according to some examples.

Merely as examples, FIG. 7, FIG. 8, and FIG. 9 illustrate frames from respective pairs of augmented videos, according to some examples. In FIG. 7, a first video item 702 has a first augmentation 706 applied to a sequence of frames. The first augmentation 706 renders flames, or a "fiery look," over facial regions of a person depicted in the video. A second video item 704 has a second augmentation 708 applied to a sequence of frames. The second augmentation 708 renders flames on top of the head of the person depicted in the video. The first augmentation 706 and the second augmentation 708 are not identical, but they have a similar visual effect and context. Accordingly, using the trained machine learning model according to examples herein, running inference on the first video item 702 and the second video item 704 respectively yields similar outputs (vectors that are close to each other). In other words, as a result of the machine learning model being trained to focus on the visual augmentation and be substantially invariant to background elements and other parts of the videos that are unrelated to augmentations, the machine learning model can extract comparable and useful outputs from different videos to which the same, or similar, augmentations are applied. The model thus learns to encode input video items in a way that captures the desired information about any visual augmentation (or augmentations) that may be applied to content in the input video item.

In FIG. 8, a first video item 802 has a first augmentation 806 applied to a sequence of frames. The first augmentation 806 renders a "green screen" effect, with the user capturing the video being shown in front of a selected "green screen" style background. A second video item 804 has a second augmentation 808 applied to a sequence of frames. The second augmentation 808 is also a "green screen" effect, but the user selected a different background than the background used in the first video item 802. Accordingly, the first augmentation 806 and the second augmentation 808 may not be visually or aesthetically similar, but they have a similar visual effect in that a "green screen" is rendered. Running inference on these two videos may thus also yield similar embeddings.

In FIG. 9, a first video item 902 has an augmentation 906 applied to a sequence of frames. The augmentation 906 is a three-dimensional augmented reality effect that renders a dancing SUPER MARIO™ character onto the frames captured by the user. A second video item 904 has the same augmentation 906 applied to its frames. Again, running inference on these two videos may yield similar embeddings, given that the two video items 902 and 904 have a visual augmentation applied thereto that results in substantially the same visual effect, even though other content in the video items 902 and 904 may be visually distinct.

The augmentations described above and shown in FIG. 7 to FIG. 9 are merely examples, and other visual augmentations, such as various augmented reality effects or video filters, may be employed.

Figure 10:
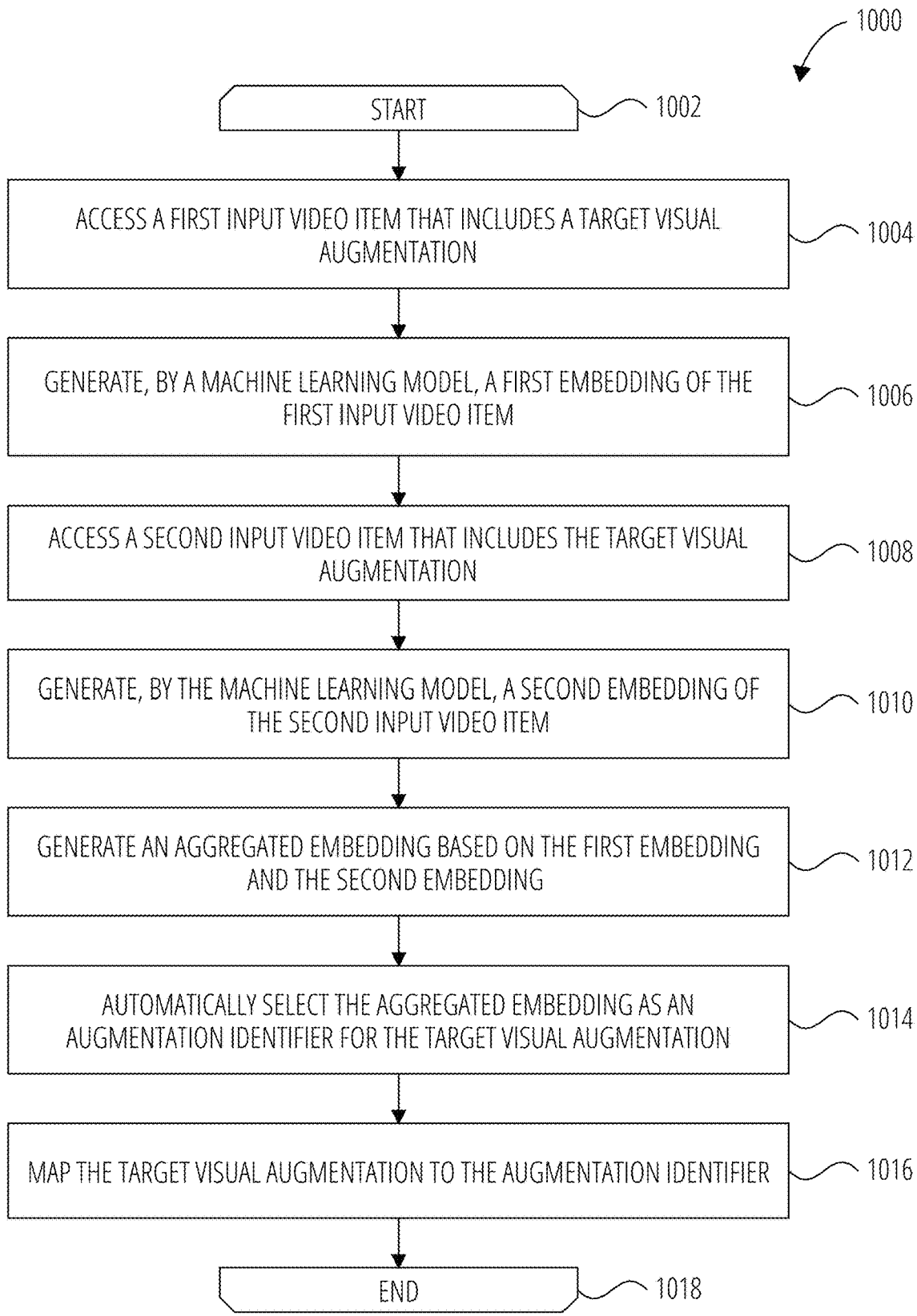
FIG. 10 is a flow diagram illustrating a method of using a machine learning model to generate embeddings and mapping a target visual augmentation to an augmentation identifier, according to some examples.

As described above, the trained machine learning model produces, from an input video item, an embedding, which is a vector representation of a visual effect, created by an augmentation within the input video item. FIG. 10 is a flow diagram illustrating a method 1000 of using a machine learning model to generate embeddings of a target visual augmentation, and mapping the target visual augmentation to an augmentation identifier, according to some examples.

The machine learning model may be a model that is trained according to the unsupervised training process described with reference to FIG. 5. Operations described with reference to FIG. 10 may be performed by components of the interaction system 100, including, for example, the artificial intelligence and machine learning system 230 and the embedding and mapping system 232.

The method 1000 commences at opening loop element 1002, and progresses to operation 1004, where the embedding and mapping system 232 accesses a first input video item that includes a target visual augmentation at operation 1004. The "target" visual augmentation is a specific visual augmentation used within the interaction system 100 for which an embedding is sought. In other words, the target visual augmentation can be seen as an augmentation of interest. For example, an embedding may be sought or requested for one of the "fiery look" visual augmentations as depicted in FIG. 7.

The first input video item includes video content and the target visual augmentation. In some examples, an input video item can be generated in "post-production," using the augmentation rendering service 306 or another augmentation rendering component. Alternatively, a video captured by a user, in which the target visual augmentation was applied to a video stream, may be retrieved from the database 128.

At operation 1006, the first input video item is fed to the machine learning model as query data and the machine learning model generates a first embedding (e.g., using the trained "online branch" as described above). The first embedding is a first vector representation capturing the visual effect of the target visual augmentation within the first input video item. This may be obtained using a suitable video model, e.g., a MoViNet type model, as described above. As mentioned, the embedding and mapping system 232 may utilize functionality of the artificial intelligence and machine learning system 230 to run inference using the machine learning model. An input video item may be consumed by the machine learning model in an appropriate format, e.g., a binary format, converted to a representation, and then transformed to a lower-dimensional representation by a predictor network to output the final model output (assessment).

At operation 1008, the embedding and mapping system 232 accesses a second input video item. The second input video item also includes the target visual augmentation, but the target visual augmentation is not applied to the same video content as in the first input video item. For example, the first input video item may be rendered by applying the target visual augmentation to a first plate video, and the second input video item may be rendered by applying the target visual augmentation to a second plate video.

At operation 1010, the second input video item is fed to the machine learning model as query data and the machine learning model generates a second embedding. The second embedding is a second vector representation capturing the visual effect of the target visual augmentation within the first input video item. In light of the training of the machine learning model to minimize loss between positive pairs, and given that the same target visual augmentation is applied to both input video items, it produces two similar embeddings. In the context of this disclosure, the term "similar," when used with respect to vector representations such as embeddings, means that the two representations are relatively close to each other in the vector space, as opposed to representations generated for distinct visual augmentations which would be relatively far from each other in the vector space. Suitable metrics, such as cosine similarity or Euclidean distance, may be employed to measure this "similarity."

The embedding and mapping system 232 generates an aggregated embedding based on the first embedding and the second embedding at operation 1012. For example, the processing component 308 may obtain both embeddings and determine a mean of the first embedding and the second embedding (e.g., a new vector based on the averages of the corresponding values of the two initial vectors). At operation 1014, the embedding and mapping system 232 then designates the aggregated embedding as an augmentation identifier for the target visual augmentation, and this relationship may be recorded in the embedding data storage component 314 or another database 128. In this way, a one-to-one mapping between the target visual augmentation and the augmentation identifier (in this case, the aggregated embedding) is determined (operation 1016) and can be used to facilitate various tasks. The operations of the method 1000 may be repeated for multiple other target visual augmentations to map such other target visual augmentations to their corresponding embeddings. The method 1000 concludes at closing loop element 1018.

In the example of FIG. 10, two embeddings are generated for a particular visual augmentation and are aggregated to arrive at a final embedding that is used to identify the visual augmentation and compare it with other visual augmentations. However, it will be appreciated that this approach is merely an example. In some cases, only one embedding may be generated per visual augmentation without any aggregation. In other cases, more than two embeddings may be generated per target visual augmentation. For example, 50, 100, or 1000 embeddings may be produced based on different videos that all include a particular target visual augmentation (e.g., all the plate videos in a data set used by the augmentation rendering service 306), in order to produce a reliable final, or aggregated, augmentation identifier.

Figure 11:
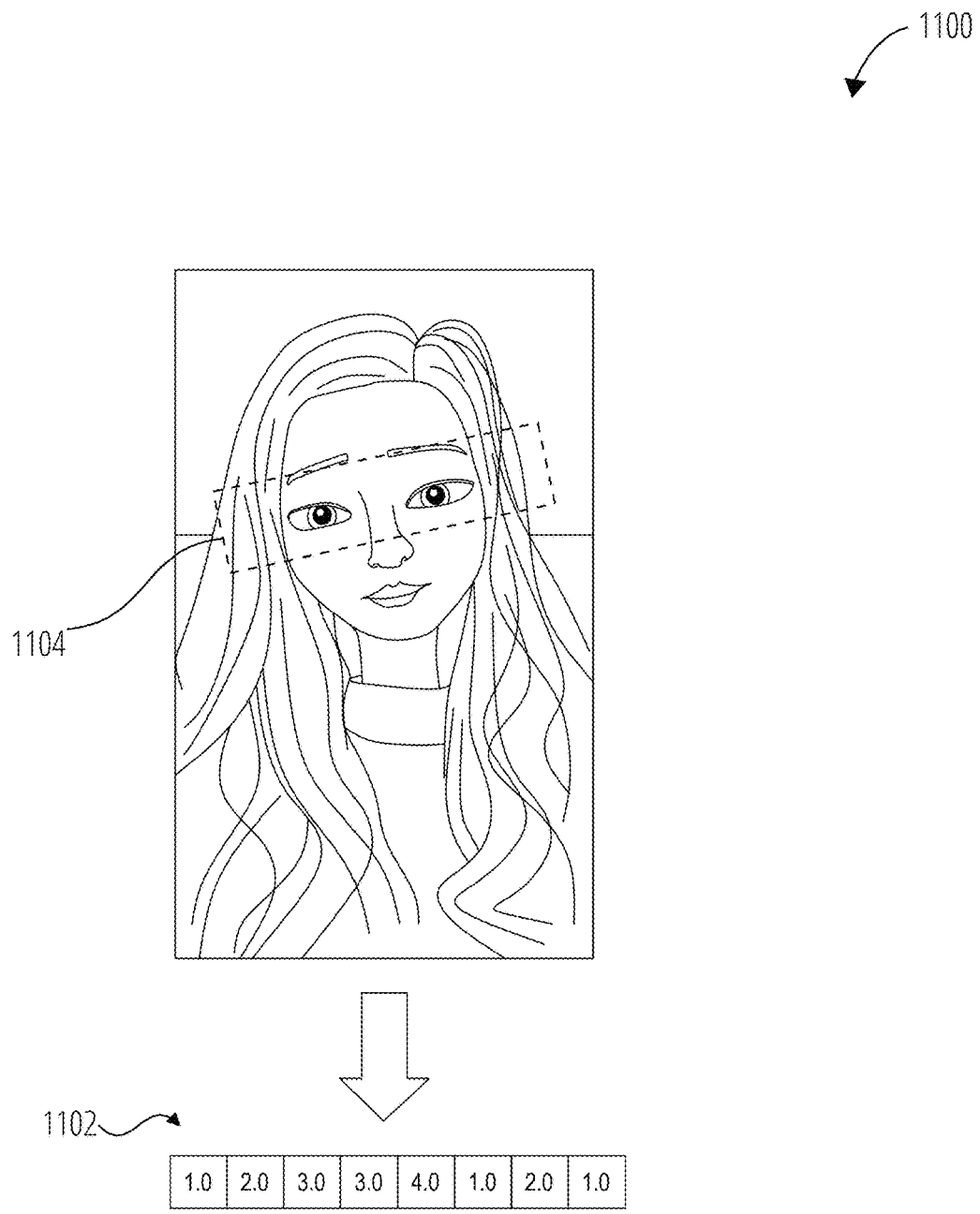
FIG. 11 is a diagram that conceptually illustrates the generation of an embedding to capture visual effects or features of a visual augmentation, according to some examples.

The diagram 1100 in FIG. 11 conceptually illustrates an embedding 1102 generated to capture the visual effect of a target visual augmentation in the example form of a "big eyes" augmentation 1104. The augmentation 1104 is a visual augmentation that is rendered, for example, by the image processing system 202 of the interaction system 100, by modifying the eye regions of a user captured in a video stream.

Figure 12:
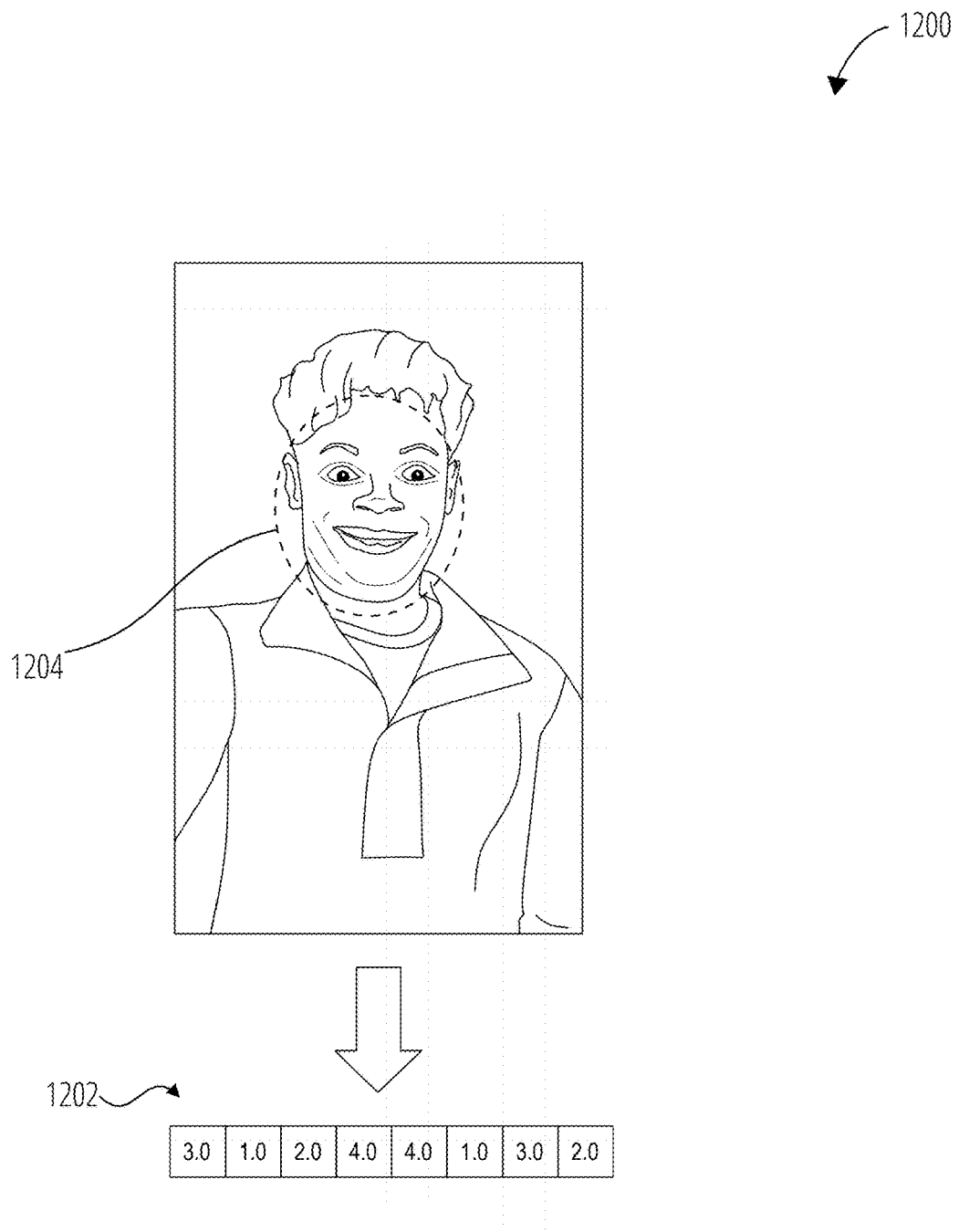
FIG. 12 is a diagram that conceptually illustrates the generation of an embedding to capture visual effects or features of a visual augmentation, according to some examples.

The diagram 1200 in FIG. 12 conceptually illustrates an embedding 1202 generated to capture the visual effect of another target visual augmentation in the example form of a "funny face" augmentation 1204. The augmentation 1204 is a visual augmentation that is rendered, for example, by the image processing system 202 of the interaction system 100, by adapting the facial features of a user captured in a video stream to have a different appearance.

Figure 13:
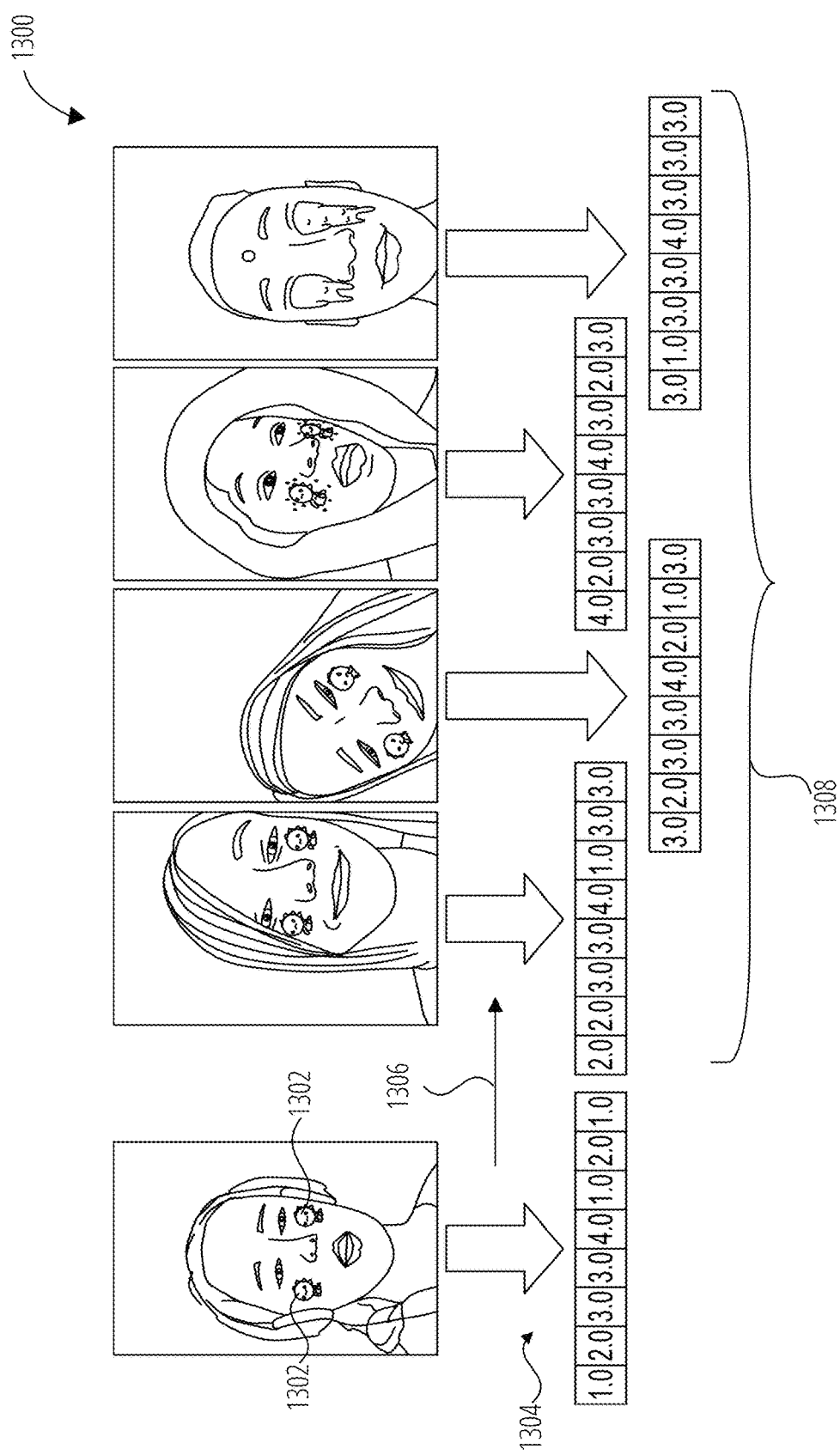
FIG. 13 is a diagram that conceptually illustrates the use of an augmentation identifier in an automated nearest-neighbor process, according to some examples.

As mentioned above, embeddings generated according to examples of the present disclosure may be used for various purposes. FIG. 13 is a diagram 1300 that conceptually illustrates the use of an augmentation identifier generated with respect to a visual augmentation of interest, in a nearest-neighbor process.

As shown in FIG. 13, a query embedding 1304 is generated for a query augmentation 1302. For example, the embedding and mapping system 232 of the interaction system 100 may receive a video or still image that comprises the query augmentation 1302, obtain its embedding, and execute an automated query process 1306 to retrieve similar, or "nearest-neighbor," augmentations from a set of embeddings stored in the embedding data storage component 314.

The embedding and mapping system 232 uses the vector representation of the query augmentation 1302, which captures the visual effect of the query augmentation 1302, and retrieves a set of four similar embeddings, e.g., vector representations of visual augmentations that are closest to the query embedding 1304 in the vector space. As shown in FIG. 13, the retrieved embeddings, or nearest neighbors 1308, are similar, but not identical, to the query embedding 1304, and their corresponding visual augmentations thus render similar visual effects when compared to the query augmentation 1302.

Retrieval of such embeddings may be useful, e.g., to present, to a user of the interaction client 104, a set of possible visual augmentations for selection. A similar approach may also be followed to identify visual augmentations that have been duplicated or possibly duplicated, e.g., in a database 128 of the interaction system 100, thereby to ensure that a user of the interaction client 104 is not presented with duplicated or irrelevant content.

The embedding and mapping system 232 may also compare a target augmentation identifier (e.g., the query embedding 1304) with identifiers of one or more reference visual augmentations to determine a degree of similarity between the target visual augmentation and the reference visual augmentations. In some examples, instead of (or in addition to) identifying the nearest neighbors 1308, the query process 1306 may identify a match. For example, if the query embedding 1304 is identical to an embedding stored in the embedding data storage component 314 or exceeds a threshold similarity, the embedding and mapping system 232 may determine that the query augmentation 1302 matches a stored augmentation. Matching may be useful, for example, to accurately identify a visual augmentation in content uploaded to the interaction system 100 by a user. In such cases, the interaction system 100 may query a database 128 to identify the target visual augmentation based on the augmentation identifier (embedding generated for the uploaded content).

These and other downstream activities may utilize machine learning models. Examples include an augmentation ranking model (e.g., to suggest the best augmentation on or for a particular scene), an augmentation retrieval model (this may be referred to as a lens-to-lens retrieval model), an augmentation deduplication model, an augmentation tagging model, or a matching model that is designed to evaluate the fit between an augmentation and a scene (e.g., image or video).

Data Architecture

Figure 14:
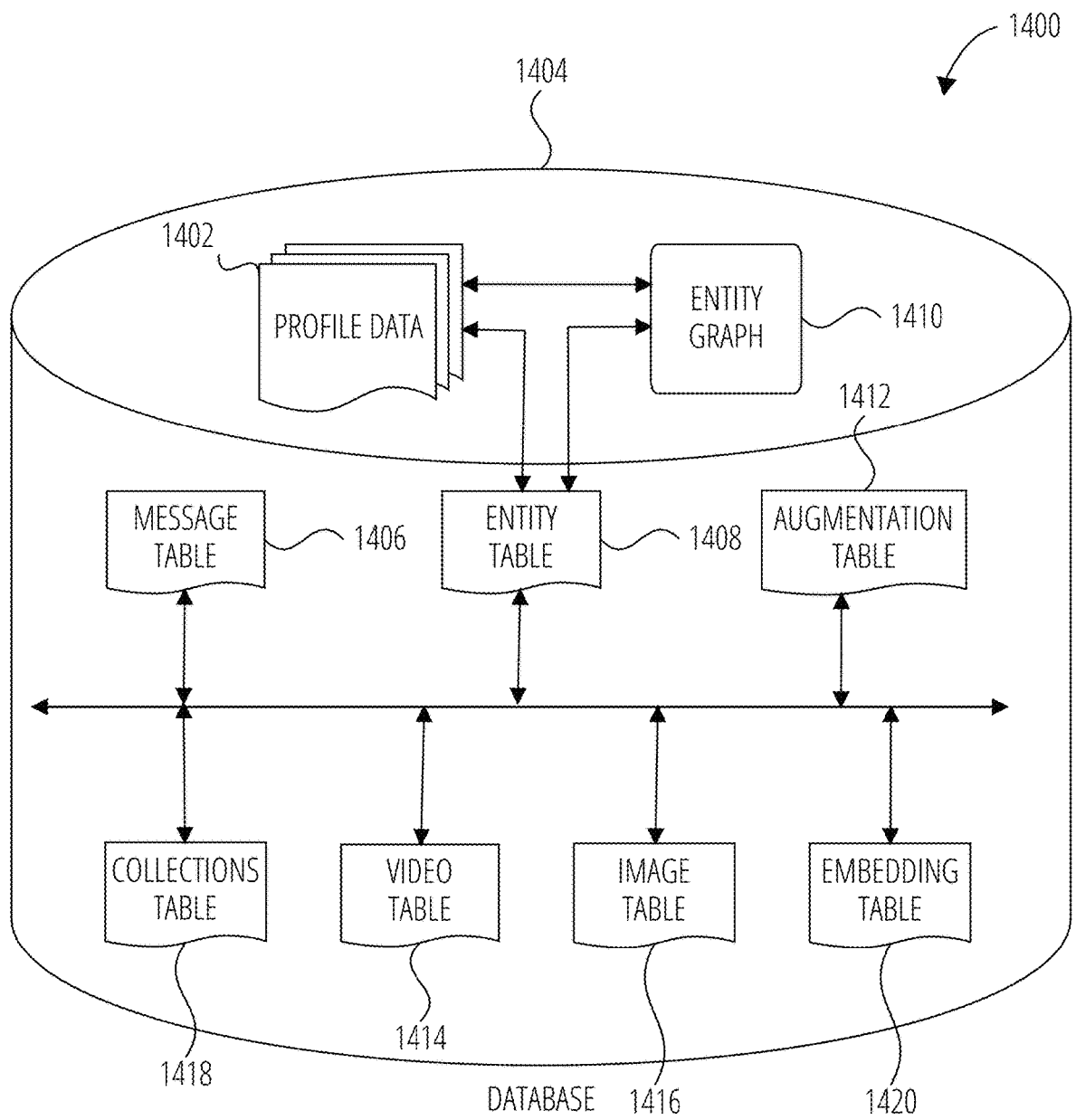
FIG. 14 is a diagrammatic representation of a data structure as maintained in a database, according to some examples.

FIG. 14 is a schematic diagram illustrating data structures 1400, which may be stored in a database 1404 of the interaction server system 110 (e.g., the database 128 or another database), according to certain examples. While the content of the database 1404 is shown to comprise multiple tables, it will be appreciated that the data could be stored in other types of data structures (e.g., as an object-oriented database).

The database 1404 includes message data stored within a message table 1406. This message data includes, for any particular message, at least message sender data, message recipient (or receiver) data, and a payload. Further details regarding information that may be included in a message, and included within the message data stored in the message table 1406, are described below with reference to FIG. 15.

An entity table 1408 stores entity data, and is linked (e.g., referentially) to an entity graph 1410 and profile data 1402. Entities for which records are maintained within the entity table 1408 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 1410 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 1408. Such privacy settings may be applied to all types of relationships within the context of the interaction system 100, or may selectively be applied to certain types of relationships.

The profile data 1402 stores multiple types of profile data about a particular entity. The profile data 1402 may be selectively used and presented to other users of the interaction system 100 based on privacy settings specified by a particular entity. Where the entity is an individual, the profile data 1402 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 1402 for the group may similarly include one or more avatar representations associated with the group, in addition to the group name, members, and various settings (e.g., notifications) for the relevant group.

The database 1404 also stores augmentation data, such as overlays or filters, in an augmentation table 1412. The augmentation data is associated with and applied to videos (for which data is stored in a video table 1414) and images (for which data is stored in an image table 1416). Augmentations may be visual augmentations or other types of augmentations, such as audio augmentations, or combinations thereof.

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 1416 includes augmented reality content items (e.g., corresponding to applying "lenses" or augmented reality experiences). An augmented reality content item may be a real-time special effect and sound that may be added to an image or a video.

A collections table 1418 stores data regarding collections of messages and associated image, video, or audio data, which are compiled into a collection (e.g., a story or a gallery). The creation of a particular collection may be initiated by a particular user (e.g., each user for which a record is maintained in the entity table 1408). A user may create a "personal story" in the form of a collection of content that has been created and sent/broadcast by that user.

To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 1414 stores video data that, in some examples, is associated with messages for which records are maintained within the message table 1406. The video table 1414 may also store video items that are used as input for machine learning models to generate embeddings as described herein, e.g., as training data or query data for an inference phase. Similarly, the image table 1416 stores image data associated with messages for which message data is stored in the entity table 1408. The entity table 1408 may associate various augmentations from the augmentation table 1412 with various images and videos stored in the image table 1416 and the video table 1414.

The databases 1404 also include an embedding table 1420 that stores data relating to embeddings generated according to examples described herein. The embedding table 1420 may, for example, include mappings of visual augmentations to corresponding embeddings, aggregated embeddings, or details of individual embeddings used to determine aggregated embeddings.

Data Communications Architecture

Figure 15:
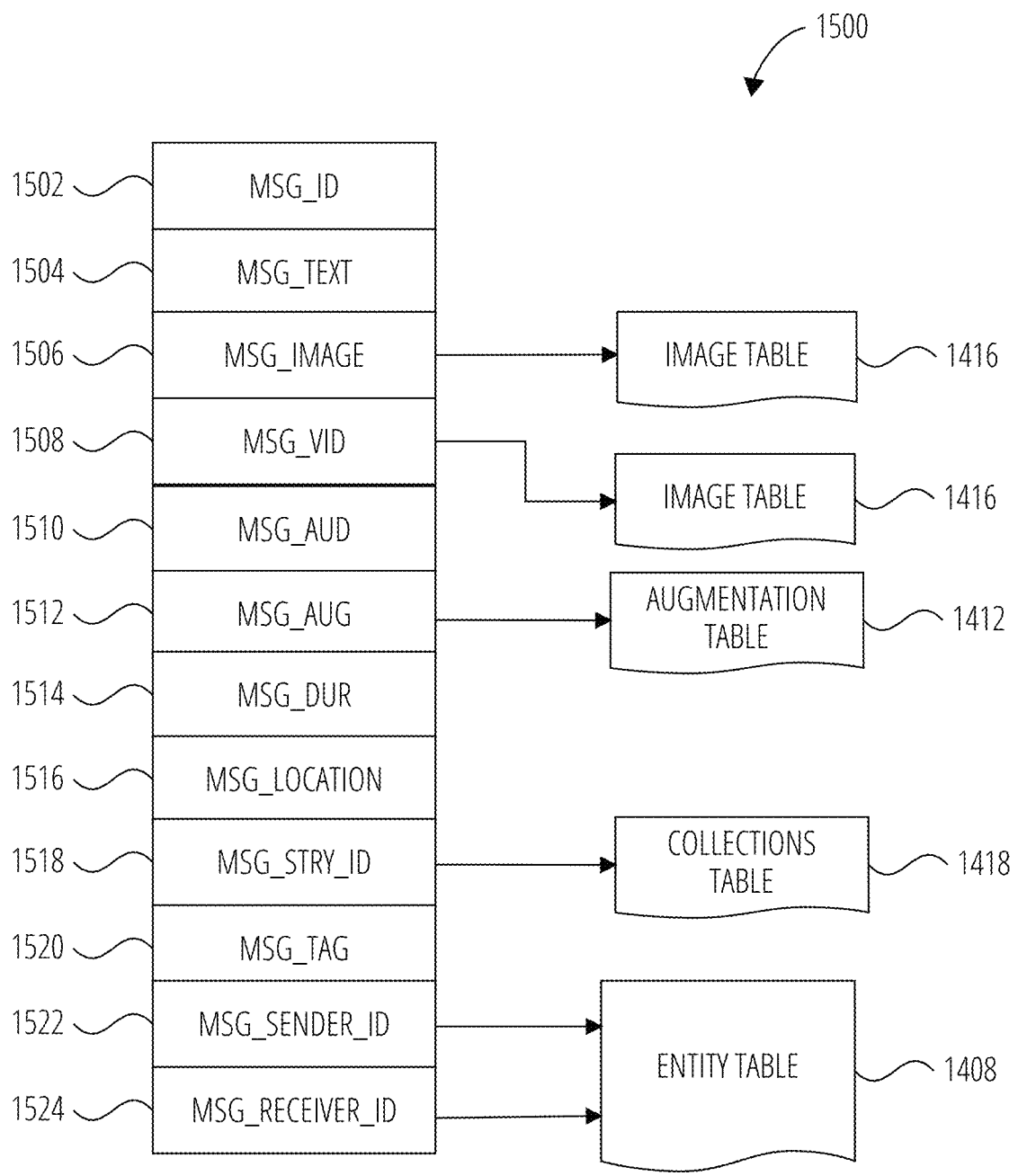
FIG. 15 is a diagrammatic representation of a message, according to some examples.

FIG. 15 is a schematic diagram illustrating a structure of a message 1500, according to some examples, generated by an interaction client 104 for communication to a further interaction client 104 via the interaction servers 124. The content of a particular message 1500 is used to populate the message table 1406 stored within the database 1404, accessible by the interaction servers 124. Similarly, the content of a message 1500 is stored in memory as "in-transit" or "in-flight" data of the user system 102 or the interaction servers 124. A message 1500 is shown to include the following example components:

Message identifier 1502: a unique identifier that identifies the message 1500.

Message text payload 1504: text, to be generated by a user via a user interface of the user system 102, and that is included in the message 1500.

Message image payload 1506: image data, captured by a camera component of a user system 102 or retrieved from a memory component of a user system 102, and that is included in the message 1500. Image data for a sent or received message 1500 may be stored in the image table 1416.

Message video payload 1508: video data, captured by a camera component or retrieved from a memory component of the user system 102, and that is included in the message 1500. Video data for a sent or received message 1500 may be stored in the image table 1416.

Message audio payload 1510: audio data, captured by a microphone or retrieved from a memory component of the user system 102, and that is included in the message 1500.

Message augmentation data 1512: augmentation data (e.g., filters, stickers, or other annotations or enhancements) that represents augmentations to be applied to message image payload 1506, message video payload 1508, or message audio payload 1510 of the message 1500. Augmentation data for a sent or received message 1500 may be stored in the augmentation table 1412.

Message duration parameter 1514: parameter value indicating, in seconds, the amount of time for which content of the message (e.g., the message image payload 1506, message video payload 1508, message audio payload 1510) is to be presented or made accessible to a user via the interaction client 104.

Message geolocation parameter 1516: geolocation data (e.g., latitudinal and longitudinal coordinates) associated with the content payload of the message. Multiple message geolocation parameter 1516 values may be included in the payload, each of these parameter values being associated with respect to content items included in the content (e.g., a specific image within the message image payload 1506, or a specific video in the message video payload 1508).

Message story identifier 1518: identifier values identifying one or more content collections (e.g., "stories" identified in the collections table 1418) with which a particular content item in the message image payload 1506 of the message 1500 is associated. For example, multiple images within the message image payload 1506 may each be associated with multiple content collections using identifier values.

Message tag 1520: each message 1500 may be tagged with multiple tags, each of which is indicative of the subject matter of content included in the message payload. For example, where a particular image included in the message image payload 1506 depicts an animal (e.g., a lion), a tag value may be included within the message tag 1520 that is indicative of the relevant animal. Tag values may be generated manually, based on user input, or may be automatically generated using, for example, image recognition.

Message sender identifier 1522: an identifier (e.g., a messaging system identifier, email address, or device identifier) indicative of a user of the user system 102 on which the message 1500 was generated and from which the message 1500 was sent.

Message receiver identifier 1524: an identifier (e.g., a messaging system identifier, email address, or device identifier) indicative of a user of the user system 102 to which the message 1500 is addressed.

The contents (e.g., values) of the various components of message 1500 may be pointers to locations in tables within which content data values are stored. For example, an image value in the message image payload 1506 may be a pointer to (or address of) a location within an image table 1416. Similarly, values within the message video payload 1508 may point to data stored within an image table 1416, values stored within the message augmentation data 1512 may point to data stored in an augmentation table 1412, values stored within the message story identifier 1518 may point to data stored in a collections table 1418, and values stored within the message sender identifier 1522 and the message receiver identifier 1524 may point to user records stored within an entity table 1408.

System with Head-Wearable Apparatus

Figure 16:
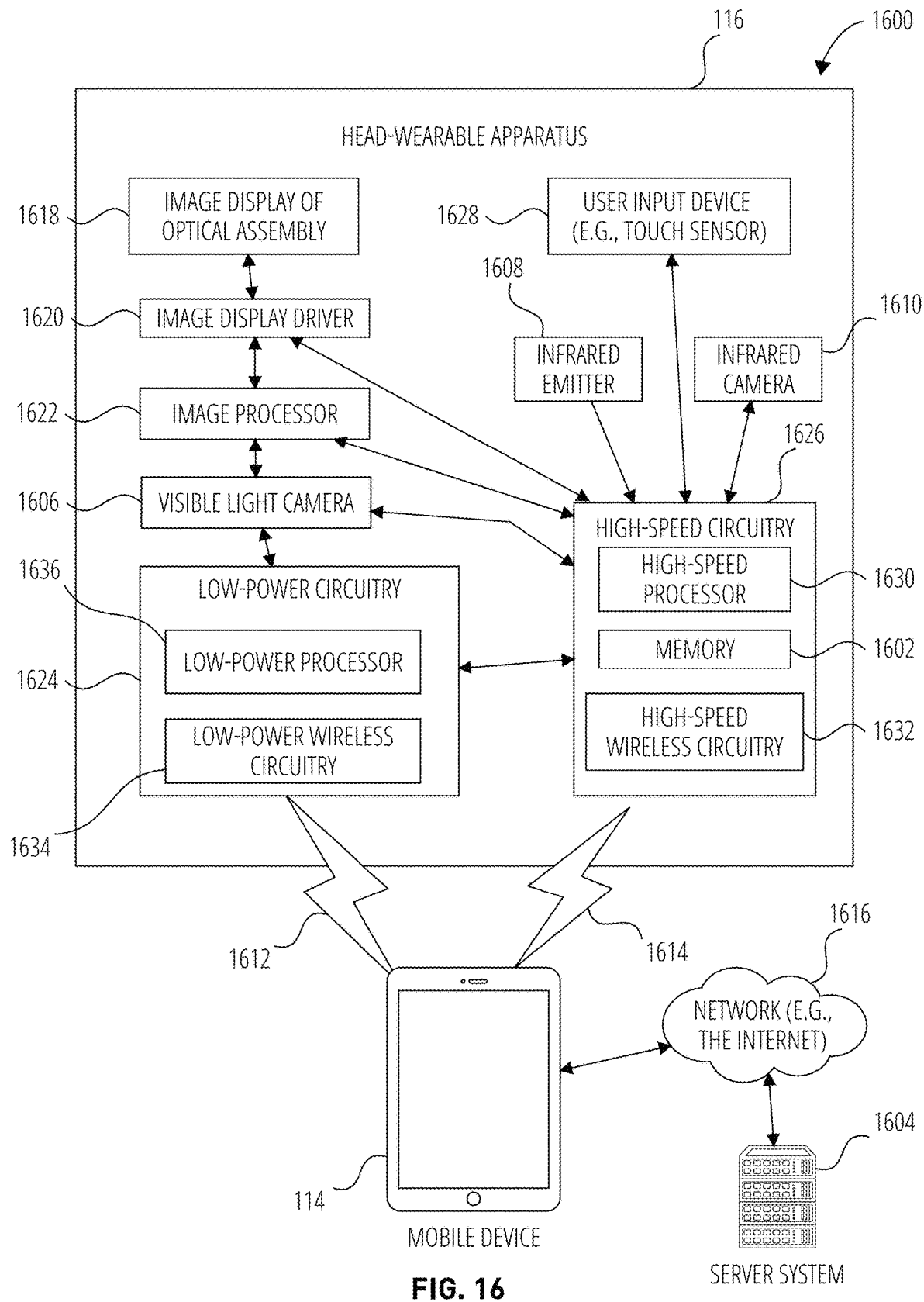
FIG. 16 illustrates a system including a head-wearable apparatus, according to some examples.

FIG. 16 illustrates a system 1600 including a head-wearable apparatus 116 with a selector input device, according to some examples. FIG. 16 is a high-level functional block diagram of an example head-wearable apparatus 116 communicatively coupled to a mobile device 114 and various server systems 1604 (e.g., the interaction server system 110) via various networks 108.

The head-wearable apparatus 116 includes one or more cameras, each of which may be, for example, a visible light camera 1606, an infrared emitter 1608, and an infrared camera 1610.

The mobile device 114 connects with head-wearable apparatus 116 using both a low-power wireless connection 1612 and a high-speed wireless connection 1614. The mobile device 114 is also connected to the server system 1604 and the network 1616.

The head-wearable apparatus 116 further includes two image displays of the image display of optical assembly 1618. The two image displays of optical assembly 1618 include one associated with the left lateral side and one associated with the right lateral side of the head-wearable apparatus 116. The head-wearable apparatus 116 also includes an image display driver 1620, an image processor 1622, low-power circuitry 1624, and high-speed circuitry 1626. The image display of optical assembly 1618 is for presenting images and videos, including an image that can include a graphical user interface to a user of the head-wearable apparatus 116.

The image display driver 1620 commands and controls the image display of optical assembly 1618. The image display driver 1620 may deliver image data directly to the image display of optical assembly 1618 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1628 (e.g., touch sensor or push button), including an input surface on the head-wearable apparatus 116. The user input device 1628 (e.g., touch sensor or push button) is to receive from the user an input selection to manipulate the graphical user interface of the presented image.

The components shown in FIG. 16 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1606 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1602, which stores instructions to perform a subset or all of the functions described herein. The memory 1602 can also include a storage device.

As shown in FIG. 16, the high-speed circuitry 1626 includes a high-speed processor 1630, a memory 1602, and high-speed wireless circuitry 1632. In some examples, the image display driver 1620 is coupled to the high-speed circuitry 1626 and operated by the high-speed processor 1630 in order to drive the left and right image displays of the image display of optical assembly 1618. The high-speed processor 1630 may be any processor capable of managing high-speed communications and operation of any general computing system needed for the head-wearable apparatus 116. The high-speed processor 1630 includes processing resources needed for managing high-speed data transfers on a high-speed wireless connection 1614 to a wireless local area network (WLAN) using the high-speed wireless circuitry 1632. In certain examples, the high-speed processor 1630 executes an operating system such as a LINUX operating system or other such operating system of the head-wearable apparatus 116, and the operating system is stored in the memory 1602 for execution. In addition to any other responsibilities, the high-speed processor 1630 executing a software architecture for the head-wearable apparatus 116 is used to manage data transfers with high-speed wireless circuitry 1632. In certain examples, the high-speed wireless circuitry 1632 is configured to implement Institute of Electrical and Electronic Engineers (IEEE) 802.11 communication standards, also referred to herein as Wi-Fi®. In some examples, other high-speed communications standards may be implemented by the high-speed wireless circuitry 1632.

The low-power wireless circuitry 1634 and the high-speed wireless circuitry 1632 of the head-wearable apparatus 116 can include short-range transceivers (Bluetooth™) and wireless wide, local, or wide area network transceivers (e.g., cellular or Wi-Fi®). Mobile device 114, including the transceivers communicating via the low-power wireless connection 1612 and the high-speed wireless connection 1614, may be implemented using details of the architecture of the head-wearable apparatus 116, as can other elements of the network 1616.

The memory 1602 includes any storage device capable of storing various data and applications, including, among other things, camera data generated by the left and right visible light cameras 1606, the infrared camera 1610, and the image processor 1622, as well as images generated for display by the image display driver 1620 on the image displays of the image display of optical assembly 1618. While the memory 1602 is shown as integrated with high-speed circuitry 1626, in some examples, the memory 1602 may be an independent standalone element of the head-wearable apparatus 116. In certain such examples, electrical routing lines may provide a connection through a chip that includes the high-speed processor 1630 from the image processor 1622 or the low-power processor 1636 to the memory 1602. In some examples, the high-speed processor 1630 may manage addressing of the memory 1602 such that the low-power processor 1636 will boot the high-speed processor 1630 any time that a read or write operation involving memory 1602 is needed.

As shown in FIG. 16, the low-power processor 1636 or high-speed processor 1630 of the head-wearable apparatus 116 can be coupled to the camera (visible light camera 1606, infrared emitter 1608, or infrared camera 1610), the image display driver 1620, the user input device 1628 (e.g., touch sensor or push button), and the memory 1602.

The head-wearable apparatus 116 is connected to a host computer. For example, the head-wearable apparatus 116 is paired with the mobile device 114 via the high-speed wireless connection 1614 or connected to the server system 1604 via the network 1616. The server system 1604 may be one or more computing devices as part of a service or network computing system, for example, that includes a processor, a memory, and network communication interface to communicate over the network 1616 with the mobile device 114 and the head-wearable apparatus 116.

The mobile device 114 includes a processor and a network communication interface coupled to the processor. The network communication interface allows for communication over the network 1616, low-power wireless connection 1612, or high-speed wireless connection 1614.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1620. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1604, such as the user input device 1628, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies include:
Electroencephalography (EEG) based BMIs, which record electrical activity in the brain using electrodes placed on the scalp.
Invasive BMIs, which use electrodes that are surgically implanted into the brain.
Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1612 and high-speed wireless connection 1614 from the mobile device 114 via the low-power wireless circuitry 1634 or high-speed wireless circuitry 1632.

Machine Architecture

Figure 17:
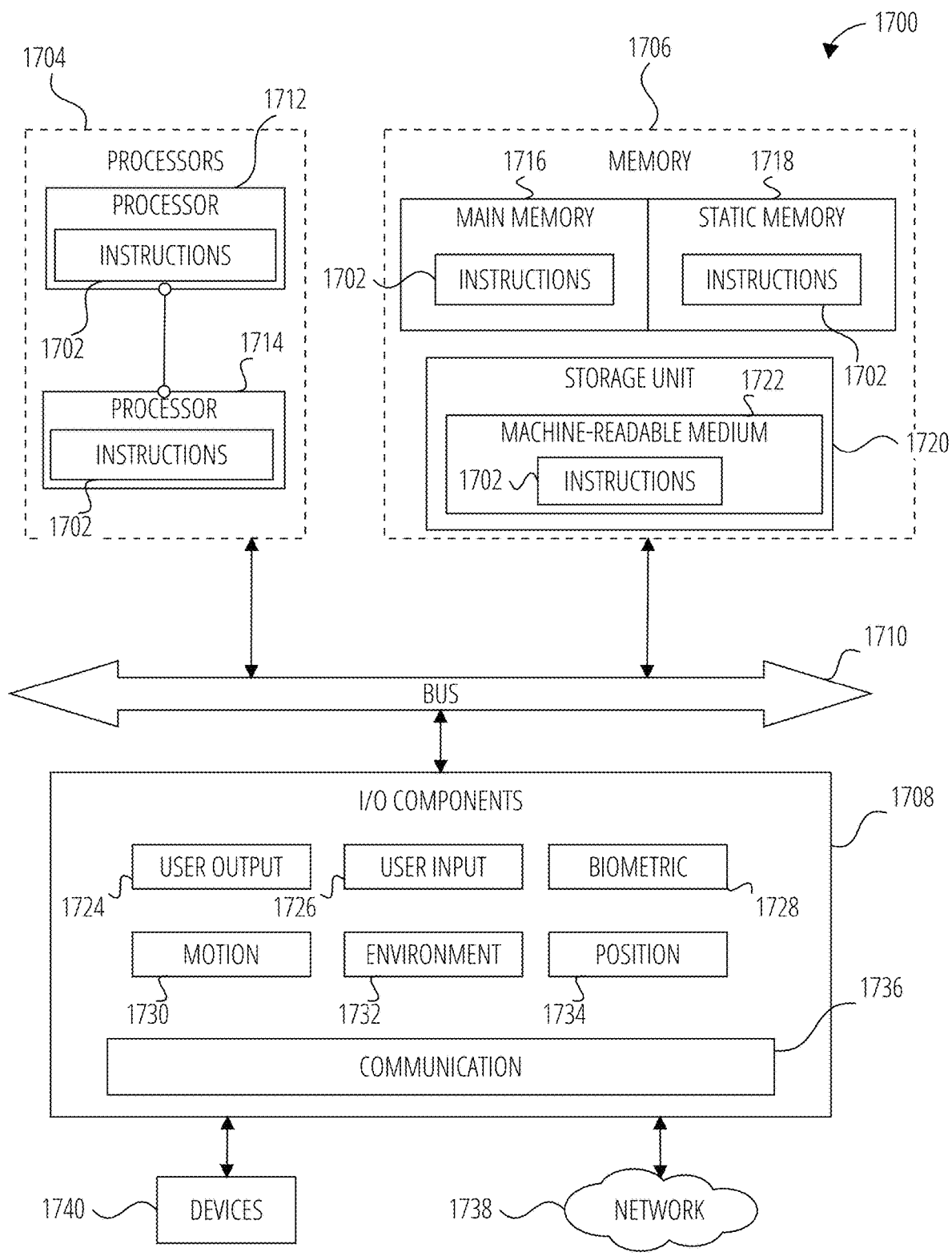
FIG. 17 is a diagrammatic representation of a machine in the form of a computer system within which a set of instructions may be executed to cause the machine to perform any one or more of the methodologies discussed herein, according to some examples.

FIG. 17 is a diagrammatic representation of the machine 1700 within which instructions 1702 (e.g., software, a program, an application, an applet, an app, or other executable code) for causing the machine 1700 to perform any one or more of the methodologies discussed herein may be executed. For example, the instructions 1702 may cause the machine 1700 to execute any one or more of the methods described herein. The instructions 1702 transform the general, non-programmed machine 1700 into a particular machine 1700 programmed to carry out the described and illustrated functions in the manner described. The machine 1700 may operate as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1702, sequentially or otherwise, that specify actions to be taken by the machine 1700. Further, while a single machine 1700 is illustrated, the term "machine" shall also be taken to include a collection of machines that individually or jointly execute the instructions 1702 to perform any one or more of the methodologies discussed herein. The machine 1700, for example, may comprise the user system 102 or any one of multiple server devices forming part of the interaction server system 110. In some examples, the machine 1700 may also comprise both client and server systems, with certain operations of a particular method or algorithm being performed on the server-side and with certain operations of the particular method or algorithm being performed on the client-side.

The machine 1700 may include processors 1704, memory 1706, and input/output I/O components 1708, which may be configured to communicate with each other via a bus 1710. In an example, the processors 1704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1712 and a processor 1714 that execute the instructions 1702. The term "processor" is intended to include multi-core processors that may comprise two or more independent processors (sometimes referred to as "cores") that may execute instructions contemporaneously. Although FIG. 17 shows multiple processors 1704, the machine 1700 may include a single processor with a single-core, a single processor with multiple cores (e.g., a multi-core processor), multiple processors with a single core, multiple processors with multiples cores, or any combination thereof.

The memory 1706 includes a main memory 1716, a static memory 1718, and a storage unit 1720, both accessible to the processors 1704 via the bus 1710. The main memory 1706, the static memory 1718, and storage unit 1720 store the instructions 1702 embodying any one or more of the methodologies or functions described herein. The instructions 1702 may also reside, completely or partially, within the main memory 1716, within the static memory 1718, within machine-readable medium 1722 within the storage unit 1720, within at least one of the processors 1704 (e.g., within the processor's cache memory), or any suitable combination thereof, during execution thereof by the machine 1700.

The I/O components 1708 may include a wide variety of components to receive input, provide output, produce output, transmit information, exchange information, capture measurements, and so on. The specific I/O components 1708 that are included in a particular machine will depend on the type of machine. For example, portable machines such as mobile phones may include a touch input device or other such input mechanisms, while a headless server machine will likely not include such a touch input device. It will be appreciated that the I/O components 1708 may include many other components that are not shown in FIG. 17. In various examples, the I/O components 1708 may include user output components 1724 and user input components 1726. The user output components 1724 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1726 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1708 may include biometric components 1728, motion components 1730, environmental components 1732, or position components 1734, among a wide array of other components. For example, the biometric components 1728 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components 1730 include acceleration sensor components (e.g., accelerometer), gravitation sensor components, rotation sensor components (e.g., gyroscope).

The environmental components 1732 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 3600 camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple camera systems may include a wide camera, an ultra-wide camera, a telephoto camera, a macro camera, and a depth sensor, for example.

The position components 1734 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1708 further include communication components 1736 operable to couple the machine 1700 to a network 1738 or devices 1740 via respective coupling or connections. For example, the communication components 1736 may include a network interface component or another suitable device to interface with the network 1738. In further examples, the communication components 1736 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1740 may be another machine or any of a wide variety of peripheral devices (e.g., a peripheral device coupled via a USB).

Moreover, the communication components 1736 may detect identifiers or include components operable to detect identifiers. For example, the communication components 1736 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1736, such as location via Internet Protocol (IP) geolocation, location via Wi-Fi® signal triangulation, location via detecting an NFC beacon signal that may indicate a particular location, and so forth.

The various memories (e.g., main memory 1716, static memory 1718, and memory of the processors 1704) and storage unit 1720 may store one or more sets of instructions and data structures (e.g., software) embodying or used by any one or more of the methodologies or functions described herein. These instructions (e.g., the instructions 1702), when executed by processors 1704, cause various operations to implement the disclosed examples.

The instructions 1702 may be transmitted or received over the network 1738, using a transmission medium, via a network interface device (e.g., a network interface component included in the communication components 1736) and using any one of several well-known transfer protocols (e.g., hypertext transfer protocol (HTTP)). Similarly, the instructions 1702 may be transmitted or received using a transmission medium via a coupling (e.g., a peer-to-peer coupling) to the devices 1740.

Software Architecture

Figure 18:
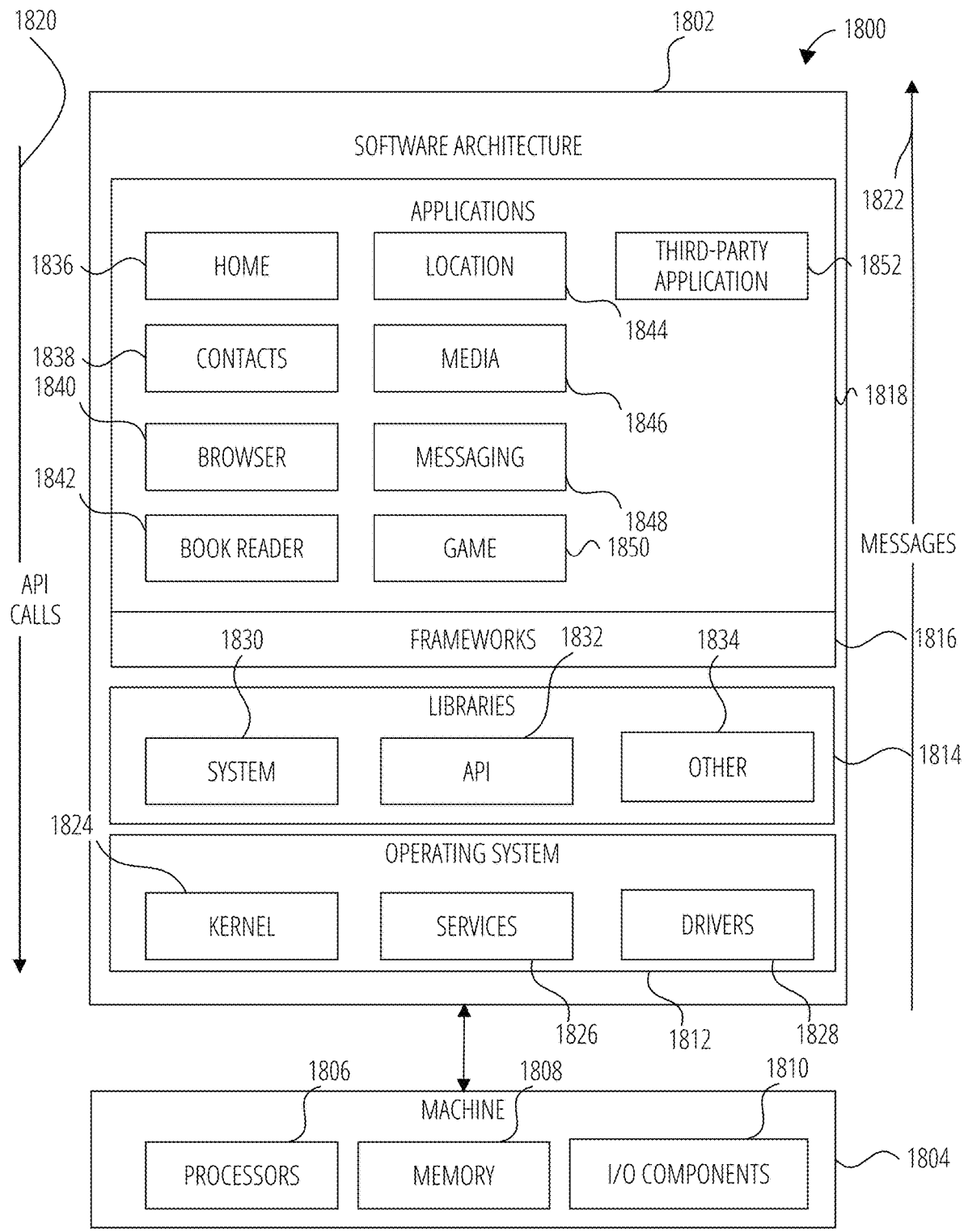
FIG. 18 is a block diagram showing a software architecture within which examples may be implemented.

FIG. 18 is a block diagram 1800 illustrating a software architecture 1802, which can be installed on any one or more of the devices described herein. The software architecture 1802 is supported by hardware such as a machine 1804 that includes processors 1806, memory 1808, and I/O components 1810. In this example, the software architecture 1802 can be conceptualized as a stack of layers, where each layer provides a particular functionality. The software architecture 1802 includes layers such as an operating system 1812, libraries 1814, frameworks 1816, and applications 1818. Operationally, the applications 1818 invoke API calls 1820 through the software stack and receive messages 1822 in response to the API calls 1820.

The operating system 1812 manages hardware resources and provides common services. The operating system 1812 includes, for example, a kernel 1824, services 1826, and drivers 1828. The kernel 1824 acts as an abstraction layer between the hardware and the other software layers. For example, the kernel 1824 provides memory management, processor management (e.g., scheduling), component management, networking, and security settings, among other functionalities. The services 1826 can provide other common services for the other software layers. The drivers 1828 are responsible for controlling or interfacing with the underlying hardware. For instance, the drivers 1828 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1814 provide a common low-level infrastructure used by the applications 1818. The libraries 1814 can include system libraries 1830 (e.g., C standard library) that provide functions such as memory allocation functions, string manipulation functions, mathematic functions, and the like. In addition, the libraries 1814 can include API libraries 1832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1814 can also include a wide variety of other libraries 1834 to provide many other APIs to the applications 1818.

The frameworks 1816 provide a common high-level infrastructure that is used by the applications 1818. For example, the frameworks 1816 provide various graphical user interface (GUI) functions, high-level resource management, and high-level location services. The frameworks 1816 can provide a broad spectrum of other APIs that can be used by the applications 1818, some of which may be specific to a particular operating system or platform.

In an example, the applications 1818 may include a home application 1836, a contacts application 1838, a browser application 1840, a book reader application 1842, a location application 1844, a media application 1846, a messaging application 1848, a game application 1850, and a broad assortment of other applications such as a third-party application 1852. The applications 1818 are programs that execute functions defined in the programs. Various programming languages can be employed to create one or more of the applications 1818, structured in a variety of manners, such as object-oriented programming languages (e.g., Objective-C, Java, or C++) or procedural programming languages (e.g., C or assembly language). In a specific example, the third-party application 1852 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1852 can invoke the API calls 1820 provided by the operating system 1812 to facilitate functionalities described herein.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; at least one memory component storing instructions that, when executed by the at least one processor, cause the at least one processor to perform operations comprising: accessing an input video item that includes, a target visual augmentation; generating, by a machine learning model, an embedding of the input video item, the machine learning model being trained, in an unsupervised training phase, to minimize loss between training video representations generated within each of a plurality of training sets, each training set comprising a plurality of different training video items that each include a predefined visual augmentation; and mapping, based on the generation of the embedding of the input video item, the target visual augmentation to an augmentation identifier.

In Example 2, the subject matter of Example 1 includes, wherein the embedding of the input video item comprises a vector representation of a visual effect of the target visual augmentation within the input video item.

In Example 3, the subject matter of Examples 1-2 includes, wherein the unsupervised training phase comprises positive-only, self-supervised contrastive learning.

In Example 4, the subject matter of Examples 1-3 includes, wherein each training set comprises a pair of training video items, and wherein the self-supervised training phase comprises: accessing a first training video item of a first pair of training video items, the first training video item comprising first video content to which a first predefined visual augmentation is applied; accessing a second training video item of the first pair of training video items, the second training video item comprising second video content to which the first predefined visual augmentation is applied; generating a vector representation of the first training video item and a vector representation of the second training video item; and generating a transformed representation based on the vector representation of the first training video item, wherein the minimizing of loss between training video representations comprises, for the first pair of training video items, utilizing a loss function to measure a similarity between the transformed representation and the vector representation of the second training video item.

In Example 5, the subject matter of Example 4 includes, wherein the self-supervised training phase further comprises: automatically updating parameters of the machine learning model to minimize the loss between training video representations within subsequent pairs of training video items based on the loss function.

In Example 6, the subject matter of Examples 4-5 includes, wherein the first video content is a first plate video and the second video content is a second plate video, the first plate video being different from the second plate video.

In Example 7, the subject matter of Example 6 includes, the operations further comprising: applying, by an augmentation rendering component, the first predefined visual augmentation to the first plate video; and applying, by the augmentation rendering component, the first predefined visual augmentation to the second plate video.

In Example 8, the subject matter of Examples 4-7 includes, wherein the generating of the transformed representation comprises transforming, by a predictor component of the machine learning model, the vector representation of the first training video item into the transformed representation to create a final prediction target for the machine learning model.

In Example 9, the subject matter of Examples 1-8 includes, wherein the input video item is a first input video item and the embedding of the first input video item is a first embedding, the operations further comprising: accessing a second input video item that includes the target visual augmentation; generating, by the machine learning model, a second embedding of the second input video item; and generating, based on the first embedding and the second embedding, an aggregated embedding, the aggregated embedding representing a visual effect of the target visual augmentation.

In Example 10, the subject matter of Example 9 includes, wherein the generating of the aggregated embedding comprises determining a mean of the first embedding and the second embedding.

In Example 11, the subject matter of Examples 9-10 includes, wherein the augmentation identifier is the aggregated embedding.

In Example 12, the subject matter of Examples 1-11 includes, the operations further comprising: automatically comparing the augmentation identifier with an embedding of a reference visual augmentation to determine a degree of similarity between the target visual augmentation and the reference visual augmentation.

In Example 13, the subject matter of Examples 1-12 includes, wherein the machine learning model is a first machine learning model, the operations further comprising: transmitting the augmentation identifier to a second machine learning model, the second machine learning model comprising at least one of an augmentation ranking model, an augmentation retrieval model, an augmentation deduplication model, an augmentation tagging model, or an augmentation clustering model.

In Example 14, the subject matter of Examples 1-13 includes, the operations further comprising: querying a database to identify the target visual augmentation based on the augmentation identifier.

In Example 15, the subject matter of Examples 1-14 includes, the operations further comprising: receiving the input video item from a user device, the target visual augmentation having been applied to the input video item by a user of the user device.

In Example 16, the subject matter of Examples 1-15 includes, wherein the target visual augmentation is an augmented reality effect.

In Example 17, the subject matter of Example 16 includes, wherein the augmented reality effect is a video filter.

In Example 18, the subject matter of Examples 1-17 includes, wherein the input video item is in a binary file format.

Example 19 is a method comprising: accessing an input video item that includes, a target visual augmentation; generating, by a machine learning model, an embedding of the input video item, the machine learning model being trained, in an unsupervised training phase, to minimize loss between training video representations generated within each of a plurality of training sets, each training set comprising a plurality of different training video items that each include a predefined visual augmentation; and mapping, based on the generation of the embedding of the input video item, the target visual augmentation to an augmentation identifier.

Example 20 is a non-transitory computer-readable storage medium storing instructions that, when executed by at least one processor, cause the at least one processor to perform operations comprising: accessing an input video item that includes, a target visual augmentation; generating, by a machine learning model, an embedding of the input video item, the machine learning model being trained, in an unsupervised training phase, to minimize loss between training video representations generated within each of a plurality of training sets, each training set comprising a plurality of different training video items that each include a predefined visual augmentation; and mapping, based on the generation of the embedding of the input video item, the target visual augmentation to an augmentation identifier.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

CONCLUSION

Examples of the present disclosure provide techniques for the training of machine learning models to generate vector representations of visual augmentations applied to content items, the deployment of such machine learning models, and the mapping of vector representations to their corresponding visual augmentations.

Examples of the present disclosure may allow for enhanced understanding of augmentations, or the manner in which they are applied by users, thereby improving the ability to personalize content or augmentation options presented to users of an interaction system. In this way, the quality or diversity of content may be improved, recommendations may be enhanced, and. ultimately, users may be enabled to express themselves in more diverse and creative ways using technological tools.

While examples in the present disclosure describe the generation of embeddings based on video items, it should be appreciated that techniques and systems described herein may also be applied to other types of content items, such as images (e.g., a still image or a single frame). Further, while examples in the present disclosure describe embeddings that capture or represent a visual effect of an augmentation, it should be appreciated that techniques and systems described herein may also be applied to other types of embeddings, such as embeddings that aim to capture or represent audio-related features of a content item.

As used in this disclosure, the term "machine learning model" (or simply "model") may refer to a single, stand-alone model, or a combination of models. The term may also refer to a system, component or module that includes a machine learning model together with one or more supporting or supplementary components that do not necessarily perform machine learning tasks.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"User device" refers, for example, to a device accessed, controlled or owned by a user and with which the user interacts to perform an action, or an interaction with other users or computer systems.

What is claimed is:

1. A system comprising:
    at least one processor;
    at least one memory component storing instructions that, when executed by the at least one processor, cause the at least one processor to perform operations comprising:
        accessing an input video item that includes a target visual augmentation;
        generating, by a machine learning model, an embedding of the input video item, the machine learning model being trained, in an unsupervised training phase, to minimize loss between training video representations generated within each of a plurality of training sets, each training set comprising a plurality of training video items having different video content and that each include the same predefined visual augmentation; and
        mapping, based on the generation of the embedding of the input video item, the target visual augmentation to an augmentation identifier.

2. The system of claim 1, wherein the embedding of the input video item comprises a vector representation of a visual effect of the target visual augmentation within the input video item.

3. The system of claim 1, wherein the unsupervised training phase comprises positive-only, self-supervised contrastive learning.

4. The system of claim 1, wherein each training set comprises a pair of training video items, and wherein the unsupervised training phase comprises:
    accessing a first training video item of a first pair of training video items, the first training video item comprising first video content to which a first predefined visual augmentation is applied;
    accessing a second training video item of the first pair of training video items, the second training video item comprising second video content to which the first predefined visual augmentation is applied;
    generating a vector representation of the first training video item and a vector representation of the second training video item; and
    generating a transformed representation based on the vector representation of the first training video item, wherein the minimizing of loss between training video representations comprises, for the first pair of training video items, utilizing a loss function to measure a similarity between the transformed representation and the vector representation of the second training video item.

5. The system of claim 4, wherein the unsupervised training phase further comprises:
    automatically updating parameters of the machine learning model to minimize the loss between training video representations within subsequent pairs of training video items based on the loss function.

6. The system of claim 4, wherein the first video content is a first plate video and the second video content is a second plate video, the first plate video being different from the second plate video.

7. The system of claim 6, the operations further comprising:
    applying, by an augmentation rendering component, the first predefined visual augmentation to the first plate video; and
    applying, by the augmentation rendering component, the first predefined visual augmentation to the second plate video.

8. The system of claim 4, wherein the generating of the transformed representation comprises transforming, by a predictor component of the machine learning model, the vector representation of the first training video item into the transformed representation to create a final prediction target for the machine learning model.

9. The system of claim 1, wherein the input video item is a first input video item and the embedding of the first input video item is a first embedding, the operations further comprising:
   accessing a second input video item that includes the target visual augmentation;
   generating, by the machine learning model, a second embedding of the second input video item; and
   generating, based on the first embedding and the second embedding, an aggregated embedding, the aggregated embedding representing a visual effect of the target visual augmentation.

10. The system of claim 9, wherein the generating of the aggregated embedding comprises determining a mean of the first embedding and the second embedding.

11. The system of claim 9, wherein the augmentation identifier is the aggregated embedding.

12. The system of claim 1, the operations further comprising:
   automatically comparing the augmentation identifier with an embedding of a reference visual augmentation to determine a degree of similarity between the target visual augmentation and the reference visual augmentation.

13. The system of claim 1, wherein the machine learning model is a first machine learning model, the operations further comprising:
   transmitting the augmentation identifier to a second machine learning model, the second machine learning model comprising at least one of an augmentation ranking model, an augmentation retrieval model, an augmentation deduplication model, an augmentation tagging model, or an augmentation clustering model.

14. The system of claim 1, the operations further comprising:
   querying a database to identify the target visual augmentation based on the augmentation identifier.

15. The system of claim 1, the operations further comprising:
   receiving the input video item from a user device, the target visual augmentation having been applied to the input video item by a user of the user device.

16. The system of claim 1, wherein the target visual augmentation is an augmented reality effect.

17. The system of claim 16, wherein the augmented reality effect is a video filter.

18. The system of claim 1, wherein the input video item is in a binary file format.

19. A method comprising:
   accessing an input video item that includes a target visual augmentation;
   generating, by a machine learning model, an embedding of the input video item, the machine learning model being trained, in an unsupervised training phase, to minimize loss between training video representations generated within each of a plurality of training sets, each training set comprising a plurality of training video items having different video content and that each include the same predefined visual augmentation; and
   mapping, based on the generation of the embedding of the input video item, the target visual augmentation to an augmentation identifier.

20. A non-transitory computer-readable storage medium storing instructions that, when executed by at least one processor, cause the at least one processor to perform operations comprising:
   accessing an input video item that includes a target visual augmentation;
   generating, by a machine learning model, an embedding of the input video item, the machine learning model being trained, in an unsupervised training phase, to minimize loss between training video representations generated within each of a plurality of training sets, each training set comprising a plurality of training video items having different video content and that each include the same predefined visual augmentation; and
   mapping, based on the generation of the embedding of the input video item, the target visual augmentation to an augmentation identifier.

* * * * *